(12) United States Patent
Lian et al.

(10) Patent No.: US 10,852,706 B2
(45) Date of Patent: Dec. 1, 2020

(54) EXTRACTING MAXIMAL FREQUENCY RESPONSE POTENTIAL IN CONTROLLABLE LOADS

(71) Applicant: Battelle Memorial Institute, Richland, WA (US)

(72) Inventors: Jianming Lian, Richland, WA (US); Karanjit Kalsi, Richland, WA (US); Draguna Vrabie, West Richland, WA (US); Soumya Kundu, Richland, WA (US)

(73) Assignee: Battelle Memorial Institute, Richland, WA (US)

( * ) Notice: Subject to any disclaimer, the term of this patent is extended or adjusted under 35 U.S.C. 154(b) by 23 days.

(21) Appl. No.: 16/031,949

(22) Filed: Jul. 10, 2018

(65) Prior Publication Data

US 2018/0329383 A1    Nov. 15, 2018

Related U.S. Application Data

(63) Continuation-in-part of application No. 15/746,258, filed as application No. PCT/US2016/028901 on Apr. 22, 2016.
(Continued)

(51) Int. Cl.
*G05B 19/045* (2006.01)
*G05B 19/042* (2006.01)
(Continued)

(52) U.S. Cl.
CPC ....... *G05B 19/045* (2013.01); *G05B 19/0426* (2013.01); *H02J 3/24* (2013.01);
(Continued)

(58) Field of Classification Search
CPC .............. G05B 19/045; G05B 19/0426; G05B 2219/21109; G05B 2219/25268; H02J 3/24; H02J 3/14
See application file for complete search history.

(56) References Cited

U.S. PATENT DOCUMENTS

| 4,914,564 A | 4/1990 | Surauer et al. | |
|---|---|---|---|
| 2010/0072817 A1* | 3/2010 | Hirst | H02J 3/14 307/31 |

(Continued)

FOREIGN PATENT DOCUMENTS

WO    WO 2013/149076    10/2013

OTHER PUBLICATIONS

International Search Report and Written Opinion dated Jul. 25, 2016, from International Patent Application No. PCT/US2016/028901, 10 pp.

*Primary Examiner* — Thomas C Lee
*Assistant Examiner* — Michael Tang
(74) *Attorney, Agent, or Firm* — Klarquist Sparkman LLP

(57) ABSTRACT

Methods and apparatus are disclosed for extracting maximal frequency response potential in controllable loads. In one example, a method includes assigning a fitness metric to at least one electrical device coupled to a power grid, assigning a frequency threshold based on the fitness metric, and transmitting the assigned frequency threshold to the at least one electrical device. The fitness metric can be based at least in part on an availability component and a quality component associated with the at least one device and the frequency threshold can cause the at least one electrical device to activate autonomously based on a frequency of the power grid.

34 Claims, 24 Drawing Sheets

Related U.S. Application Data

(60) Provisional application No. 62/625,266, filed on Feb. 1, 2018, provisional application No. 62/197,979, filed on Jul. 28, 2015.

(51) Int. Cl.
  *H02J 3/24* (2006.01)
  *H02J 3/14* (2006.01)

(52) U.S. Cl.
  CPC ............... *G05B 2219/21109* (2013.01); *G05B 2219/25268* (2013.01); *H02J 3/14* (2013.01)

(56) References Cited

U.S. PATENT DOCUMENTS

| | | |
|---|---|---|
| 2010/0090532 A1 | 4/2010 | Shelton et al. |
| 2013/0015663 A1 | 1/2013 | Kumula et al. |
| 2013/0268132 A1 | 10/2013 | Pratt et al. |
| 2015/0022007 A1 | 1/2015 | Ma et al. |
| 2015/0112501 A1* | 4/2015 | Rombouts ................. G05F 1/66 700/295 |
| 2015/0137519 A1 | 5/2015 | Tarnowski |
| 2015/0380936 A1* | 12/2015 | Frolik ....................... H02J 3/14 307/112 |
| 2016/0257214 A1* | 9/2016 | Miftakhov .......... B60L 11/1844 |

* cited by examiner

SOFTWARE 2480 IMPLEMENTING DESCRIBED TECHNOLOGIES

EXTRACTING MAXIMAL FREQUENCY RESPONSE POTENTIAL IN CONTROLLABLE LOADS

CROSS-REFERENCE TO RELATED APPLICATIONS

This application is a continuation-in-part of U.S. patent application Ser. No. 15/746,258, entitled "FREQUENCY THRESHOLD DETERMINATION FOR FREQUENCY-RESPONSIVE LOAD CONTROLLERS," filed Jan. 19, 2018, which application is the U.S. National Stage of International Application No. PCT/US2016/028901, entitled "FREQUENCY THRESHOLD DETERMINATION FOR FREQUENCY-RESPONSIVE LOAD CONTROLLERS," filed Apr. 22, 2016, which application claims the benefit of prior U.S. Provisional Application No. 62/197,979, entitled "CONTROLLER DESIGN OF GRID FRIENDLY APPLIANCES FOR PRIMARY FREQUENCY RESPONSE," filed Jul. 28, 2015. This application also claims the benefit of prior U.S. Provisional Application No. 62/625,266, entitled "EXTRACTING MAXIMAL FREQUENCY RESPONSE POTENTIAL IN CONTROLLABLE LOADS," filed Feb. 1, 2018. The full disclosure of U.S. patent application Ser. No. 15/746,258, International Application No. PCT/US2016/028901, U.S. Provisional Application No. 62/197,979, and U.S. Provisional Application No. 62/625,266 is hereby incorporated herein by reference.

ACKNOWLEDGMENT OF GOVERNMENT SUPPORT

This invention was made with Government support under Contract No. DE-AC05-76RL01830 awarded by the U.S. Department of Energy. The Government has certain rights in the invention.

BACKGROUND

Due to growing environmental concerns and economic and political requirements, the integration of renewable energy into the power grid has become a growing trend. Renewable energy sources have the potential to lead to a significant reduction in fossil fuel consumption and carbon dioxide emissions. Renewable energy generation, however, is typically non-dispatchable because it is often operated at the maximum output due to the low marginal cost of renewable energy. In addition, the available output of renewable generation can be variable and uncertain due to the intermittency of renewable energy.

Large-scale integration of renewable energy into the power grid substantially increases the need for operational reserves. At the same time, the total system inertia, as well as contingency reserve, is decreasing as conventional generation is gradually displaced by non-dispatchable renewable generation. Therefore, it becomes extremely difficult for a system operator to maintain the stability and reliability of the power grid. If operational reserves are required to be provided by conventional generation for stability reasons, it diminishes the net carbon benefit from renewables, reduces generation efficiency, and becomes economically untenable. Hence, renewable penetration is still limited due to the lack of appropriate technologies that are able to reliably and affordably manage the dynamic variability introduced by renewable generation.

Demand-side approaches can help alleviate some of the instability resulting from renewable generation sources. Conventionally, demand-side loads are treated as passive and non-dispatchable, but demand-side approaches such as management of flexible loads have begun to be introduced. Such approaches, however, typically do not produce a frequency response curve that closely matches the desired curve, which can cause additional instability. Further, conventional demand-side approaches can over- or undercompensate by managing too many or too few loads.

SUMMARY

In today's power systems operations, traditional frequency control resources (e.g. speed governors, spinning reserves) are deployed to ensure resilient grid operations under contingencies, by restoring system frequency close to its nominal values. The importance of adequate (and cost-effective) frequency response mechanisms is expected to grow even further as the grid turns "greener" and "smarter." Electrical loads, if coordinated smartly, have the potential to provide a much faster, cleaner and less expensive alternative to the traditional frequency responsive resources. Potential of controllable loads to provide frequency response services has been explored both in academia and in industry.

In order to scalably integrate millions of controllable devices (loads) into the grid operational paradigm, a hierarchical distributed control architecture is conceptualized in which a supervisor (e.g. a load aggregator) is tasked with dispersing the response of the loads across the ensemble so that some desirable collective behavior is attained. Dispersion of load response in frequency (by assigning to each load specific frequency thresholds to respond to) allows a power-frequency droop-like response enabling easier integration of such frequency-responsive resources in the grid operational framework. However, the availability of the end-use load to respond to ancillary service requests strongly depends on the local dynamics and constraints, thereby adversely affecting the reliability of decentralized frequency control algorithms.

Examples described herein relate to frequency-responsive load controllers that control associated grid-connected electrical devices and determine frequency thresholds at which such controllers manage the associated grid-connected electrical devices. A frequency-responsive load controller can provide a demand-side contribution to stabilizing the power grid by turning a grid-connected electrical device on or off in order to bring the grid frequency closer to a target value (e.g., 50 or 60 Hz).

In some examples, we consider a hierarchical control framework for coordinating ensembles of switching loads (e.g., electric water-heaters and residential air-conditioners) to provide frequency response services to the grid operator. Each device receives a frequency threshold which it uses to activate (turn "on" or "off") autonomously (e.g., without further user intervention) when a frequency event happens. In some examples, at least some of the devices can activate at more than one level, thereby consuming varying levels of power. In some examples, at least some of the devices only activate or deactivate. In some examples, at least some of the devices are modeled as only activating or deactivating, but may actually consume varying levels of power. A metric is proposed to evaluate the "fitness" of each device in providing frequency response, while also using this metric to assign frequency thresholds in a way that can extract the maximal response potential of an ensemble.

In some examples, a frequency range extending from a target grid frequency to an end frequency can be determined. A first portion of the frequency range can be identified as a deadband within which a grid-connected electrical device is not turned on or off in response to grid frequency deviations. The first portion extends from the target grid frequency to a deadband bound frequency. A second portion of the frequency range extends from the deadband bound frequency to the end frequency. A frequency, from the frequency range, can be selected for use as the frequency threshold. The frequency threshold is the grid frequency at which the grid-connected electrical device is automatically turned off or turned on by an associated frequency-responsive load controller. If the frequency selected for use as the frequency threshold is within the deadband, the frequency threshold is set to a frequency within the second portion of the frequency range. For example, the frequency threshold can be set to a first available frequency outside the deadband.

In some examples, the frequency range is determined by receiving instructions from a supervisory coordinator configured to establish the frequency range based on aggregated characteristics of a number of grid-connected electrical devices being managed by corresponding frequency-responsive load controllers. For example, individual frequency-responsive load controllers can provide power (and state) information to the supervisory coordinator, and the coordinator can aggregate the power information and determine frequency range(s) from which frequency thresholds can be selected based on the aggregated power information and a target power-frequency curve. Power information can be re-aggregated periodically (and the frequency range recalculated) to accurately reflect the current load on the grid. In such situations, the frequency thresholds can be re-selected using the recalculated frequency range to provide the desired power-frequency curve.

This summary is provided to introduce a selection of concepts in a simplified form that are further described below in the Detailed Description. This Summary is not intended to identify key features or essential features of the claimed subject matter, nor is it intended to be used to limit the scope of the claimed subject matter. The foregoing and other objects, features, and advantages of the disclosed subject matter will become more apparent from the following Detailed Description, which proceeds with reference to the accompanying figures.

DETAILED DESCRIPTION

General Considerations

Figure 1:
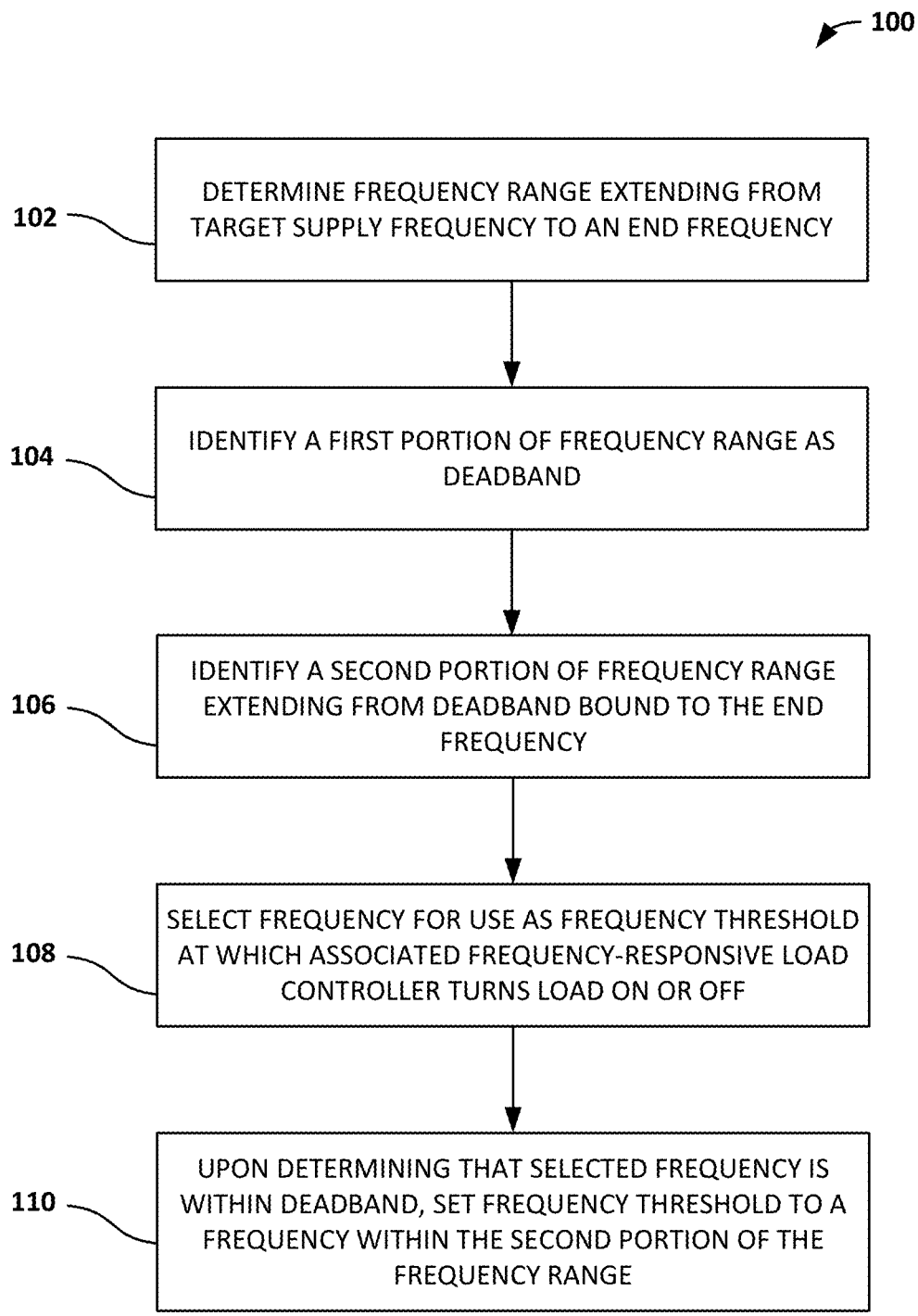
FIG. 1 is a diagram illustrating an example method of managing frequency response using a grid-connected electrical device.

For purposes of this description, certain aspects, advantages, and novel features of the embodiments of this disclosure are described herein. The disclosed methods, apparatus, and systems should not be construed as being limiting in any way. Instead, the present disclosure is directed toward all novel and nonobvious features and aspects of the various disclosed embodiments, alone and in various combinations and sub-combinations with one another. The methods, apparatus, and systems are not limited to any specific aspect or feature or combination thereof, nor do the disclosed embodiments require that any one or more specific advantages be present or problems be solved.

Although the operations of some of the disclosed embodiments are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level descriptions of the actual operations that are performed. The actual operations that correspond to these terms may vary depending on the particular implementation and are readily discernible by one of ordinary skill in the art having the benefit of the present disclosure.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "best," "minimum," or the like. It will be appreciated that such descriptions are intended to indicate that a selection among many alternatives can be made, and such selections need not be better, smaller, or otherwise preferable to other selections.

In the following description, certain terms may be used such as "up," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Using the systems, methods, and computer-readable media described herein, frequency thresholds can be determined at which grid-connected electrical devices can be turned on or off by associated frequency-responsive load controllers to provide "primary frequency response" for a power grid. As used herein, "primary frequency response" refers to adjusting system generation or system load of a power grid to balance the amount of generation with the amount of load (also referred to as demand), thereby maintaining a grid frequency (frequency of the voltage or current supplied by the grid) near to a target frequency (e.g., 50 or 60 Hz). A grid frequency that begins to drop below the target frequency indicates excess demand relative to generation, and a grid frequency that begins to rise above the target frequency indicates excess generation relative to demand. Unlike previous approaches to selection of frequency thresholds, the described technologies maintain a desired "droop-like" power-to-frequency curve that indicates grid stability. "Droop" refers to a control scheme for generators in the power grid. A device performing droop control is automatically adjusting its power output in accordance to frequency deviations. Droop can be defined as the percentage change in frequency at which the device delivers all of its frequency regulating capability. "Droop-like" refers to a scheme where a device is automatically adjusting its power output in accordance to frequency deviations, regulating frequency at a defined percentage relative to frequency deviation until the resource is exhausted. The described technologies also allow determination of frequency thresholds in both autonomous and supervised arrangements.

In an example autonomous arrangement, individual grid-connected appliances (e.g., electric water heaters) are separately and autonomously controlled by corresponding individual frequency-responsive load controllers. For a particular appliance, the frequency-responsive load controller randomly (or otherwise) selects a frequency threshold from available frequencies in a frequency range. If the selected frequency falls within a deadband, then the controller sets the frequency threshold to a frequency outside of the deadband instead. As a specific example, the controller can set the frequency threshold to a first available frequency (or a frequency within a narrow frequency band) outside of the deadband.

The deadband is a frequency range near the target frequency and within which deviations from the target frequency are considered to be small enough to ignore for demand-side primary frequency response purposes. In conventional approaches, because the frequencies within the deadband are not available to be set as the frequency threshold, the resulting distribution of frequency thresholds over all controllers is not uniform over the entire frequency range, and the power-to-frequency relationship of the grid is not droop-like. In the described technologies, however, the controller selects the frequency threshold from a frequency range that includes frequencies in the deadband, but instead of actually using the frequency within the deadband as the threshold if selected, the controller uses the closest available frequency outside of the deadband. As used herein, "available" means available for use as a frequency threshold. Frequencies within the deadband, which cannot be used as the frequency threshold, are unavailable. "Available" does not refer to a state of being "taken" or in use by another load controller. That is, if, for multiple load controllers, a frequency in the deadband is selected, more than one (or all) of the load controllers can set the frequency threshold to the first frequency outside of the deadband. When viewed on a system-wide level, this approach effectively produces a weighting scheme that approximates what a uniform distribution of frequency thresholds over the entire frequency range, including the deadband, would be. This weighted distribution achieves the proper power-to-frequency relationship for grid stability while still allowing frequency thresholds to be excluded from the deadband.

In an example supervised arrangement, a supervisory coordinator can aggregate power information (e.g., load and on/off status) for many grid-connected electrical devices. Based on the aggregate power available for being turned on or being turned off, a frequency range available for frequency thresholds can be determined based on a desired power-frequency curve. By considering the overall power of the loads available in the system, situations in which too much or too little load power is turned on or off (which creates instability in the grid) can be avoided. Individual frequency-responsive controllers can select frequency thresholds, for example as described above in the autonomous arrangement, once a frequency range has been communicated to the controllers. In some examples, frequency threshold selection for individual controllers can be performed by the supervisory coordinator, and the thresholds can be communicated to the individual controllers.

The described technologies produce a significant improvement to the power grid management technology and "smart" device technology areas. The demand-side approaches described herein reduce the need to rely on power generators to manage primary frequency response and allow for a greater integration of renewable energy sources into the grid. Further, by determining a range of frequency thresholds that result in a stable, droop-like power-to-frequency curve, the frequency-responsive controllers will be triggered less often by not having to correct the instability caused by the controllers' own response and will thus consume fewer controller computing resources. Additional examples are described below.

Frequency Threshold Selection Examples and Examples of Autonomous Arrangements

Demand-side control presents a novel and viable way to supplement the conventional generation-side control for a power grid having an increased percentage of renewable power sources. An autonomous arrangement in which frequency-responsive controllers associated with corresponding grid-connected electrical devices respond individually to frequency deviations provides a fast response time for grid stabilization. In some approaches, autonomous response occurs for under-frequency load shedding, in which loads are turned off at larger frequency deviations from a target grid frequency in order to prevent, for example, a grid or substation failure. Such approaches, however, do not provide the proper droop-like frequency response necessary for demand-side primary frequency response.

The frequency-responsive load controllers described herein can be, for example, small electronic devices that reside within grid-connected electrical devices (also referred to simply as "devices") such as appliances. The frequency-responsive load controllers (also referred to simply as "controllers") can be configured to monitor, for example, the AC voltage (or current) signal available to the devices at their wall outlets. When an under-frequency (or in some examples, an over-frequency) event is detected, the controller will alter the operating mode of a corresponding device to help the power grid, provided the device's current operating mode can be changed. In the example of an under-frequency event, the controller is configured to request that the electrical load be shed by its corresponding device whenever the grid frequency falls below a particular curtailing frequency threshold. The curtailing frequency threshold can be, for example, randomly chosen. In an over-frequency example, the controller is configured to request that an electrical device be turned on whenever the grid frequency exceeds a particular rising frequency threshold, which can also be randomly chosen.

In recent years, appliance and equipment manufacturers have moved rapidly toward mass production of devices with smart grid capabilities that can be used with the described technologies. For implementation of frequency-responsive load controllers, the response time (e.g., the time constant of a low-pass filter for frequency measurement), can directly affect the frequency response of the bulk power system. In general, the shorter the response time, the better the system response. Shorter response time, however, can lead to false inputs and noise. In practice, selection of an appropriate response time can be done by analyzing the frequency characteristics of historic frequency events.

The geographical distribution of controller-controlled devices within a system can also influence the impact of the demand-side management on the grid. Although there are indications that it may be more effective to have all the controllers deployed in the proximity of the location where the under- or over-frequency events have been caused, it is typically not possible in practice to know beforehand the location of such events. An even distribution throughout a system can be used instead. Such an even distribution can be implemented through coordination among various system operators from different areas.

Another factor that can influence the effect of controllers on frequency response in the grid is the penetration level of controllers and associated devices (how many devices having an associated controller that are currently on and are thus available to be turned off or how many devices having an associated controller that are currently off and are thus available to be turned on). Transient signals tend to increase as the penetration level of controllers increases, which can potentially drive the system to instability. One approach to limiting transients is to limit how many controllers should actually respond to under-frequency events. For an autonomous arrangement, all available controllers will typically respond, regardless of possible negative consequences of the aggregated effect. The autonomous response of controllers from different geographical locations can instead, for example, be coordinated so that negative consequences are mitigated.

Previous demand-side approaches to grid frequency management have been used for under-frequency load shedding and have not been used for primary frequency response due to, among other things, the lack of a droop-like frequency response curve. In some situations, such approaches can result in excessive power reduction, which can impact the system stability negatively.

FIG. 1 illustrates a method 100 of managing frequency response using a grid-connected electrical device. Method 100 can be performed by or using, for example, a frequency-responsive load controller connected to or installed in the grid-connected electrical device. Example frequency-responsive load controllers are discussed with respect to FIGS. 6 and 7. The discussion of method 100 also references the examples shown in FIGS. 2A, 2B, 3A, and 3B for clarity.

Figure 2A:
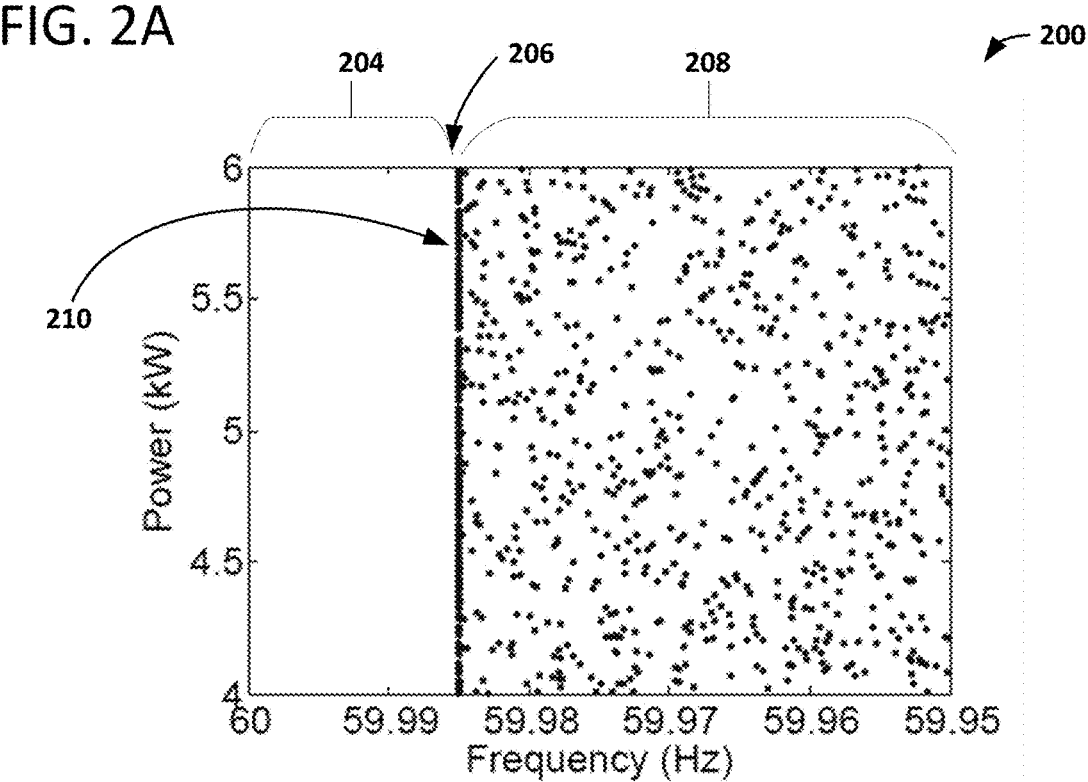
FIG. 2A is a scatter plot illustrating the curtailing frequency threshold and power of a plurality of example grid-connected electrical devices where the curtailing frequency of the devices is set to be at a first available frequency outside of the deadband if initially randomly selected to be inside the deadband.
Figure 2B:
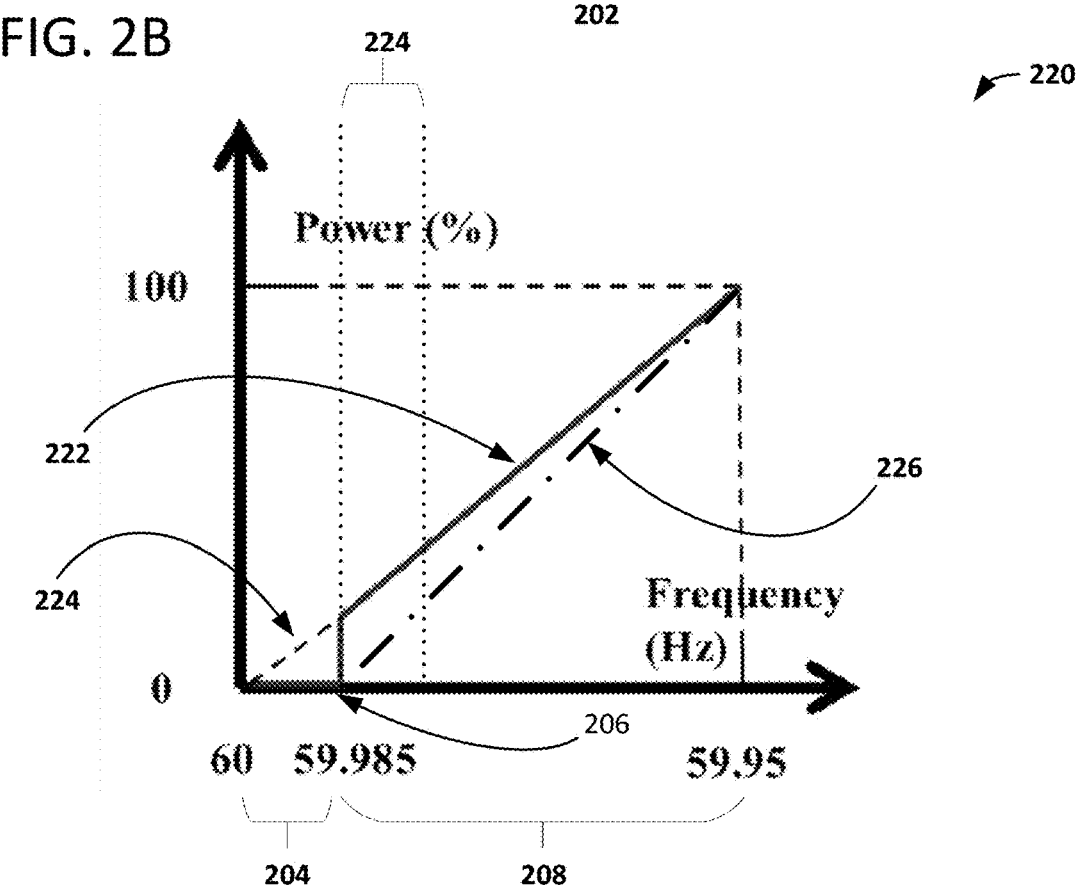
FIG. 2B is a graph illustrating a droop-like power-frequency curve resulting from the curtailing frequency thresholds illustrated in FIG. 2A.

In process block 102, a frequency range extending from a target grid frequency to an end frequency is determined. An example frequency range and target grid frequency are shown in FIGS. 2A and 2B. FIGS. 2A and 2B show plots 200 and 220, respectively, that illustrate an under-frequency case in which devices are turned off when the grid frequency falls below the target grid frequency. In FIGS. 2A and 2B, the target grid frequency is 60 Hz, and the frequency range is frequency range 202 that extends from the target grid frequency of 60 Hz to the end frequency of 59.95 Hz.

The target grid frequency can depend upon the electrical grid. For example, the target grid frequency can be 60 Hz, as is typically used in North America, or 50 Hz, as is typically used in much of Europe and the rest of the world. The end frequency can be either be below the target grid frequency, as illustrated in FIGS. 2A and 2B, or above the target grid frequency as illustrated in the over-frequency example shown in FIG. 3. The end frequency can be: predetermined or dynamically calculated based on historic under- or over-frequency events and/or historic or current total system load of controlled devices; based on empirically determined or calculated frequencies at which the grid becomes unstable or reaches a performance threshold; or based on other factors.

In process block 104, a first portion of the frequency range is identified as a deadband. The deadband extends from the target grid frequency to a deadband bound frequency. The deadband is a frequency range within which the grid-connected electrical device is not turned on or off by the frequency-responsive load controller. That is, frequency deviations within the deadband are tolerated, and demand-side management is not used to address the deviations. In the under-frequency example of FIGS. 2A and 2B, a deadband 204 is shown, extending from the target grid frequency of 60 Hz to a deadband bound frequency 206 (of 59.986 Hz). The extent of the deadband can be: predetermined or dynamically calculated based on historic under- or over-frequency events and/or historic or current total system load of controlled devices; based on controller response time; based on historic, empirically determined, or calculated frequencies at which primary frequency response is determined to be desirable; or based on other factors. In some examples, the size of deadband 204 is comparable to generation-side deadbands used in generation-side frequency response.

A second portion of the frequency range extending from the deadband bound frequency to the end frequency is identified in process block 106. With reference again to FIGS. 2A and 2B, a second portion 208 of frequency range 202 extends from a first available frequency (59.985) below deadband bound frequency 206 to the end frequency (59.95 Hz).

In process block 108, a frequency, from the frequency range (e.g., from frequency range 202 of FIG. 2A), is selected for use as a frequency threshold. The frequency threshold is a grid frequency at which the grid-connected electrical device is automatically turned off or turned on by an associated frequency-responsive load controller. In under-frequency examples, such as the example illustrated in FIGS. 2A and 2B, the deadband bound frequency is lower than the target grid frequency and the end frequency is lower than both the deadband bound frequency and the target grid frequency. In such examples, the frequency threshold is a curtailing frequency threshold, and the curtailing frequency threshold is the grid frequency at which the grid-connected electrical device is turned off by the associated frequency-responsive load controller. Frequency deviations below the target grid frequency indicate a greater load than can be supported by the current generation capacity.

Figure 3A:
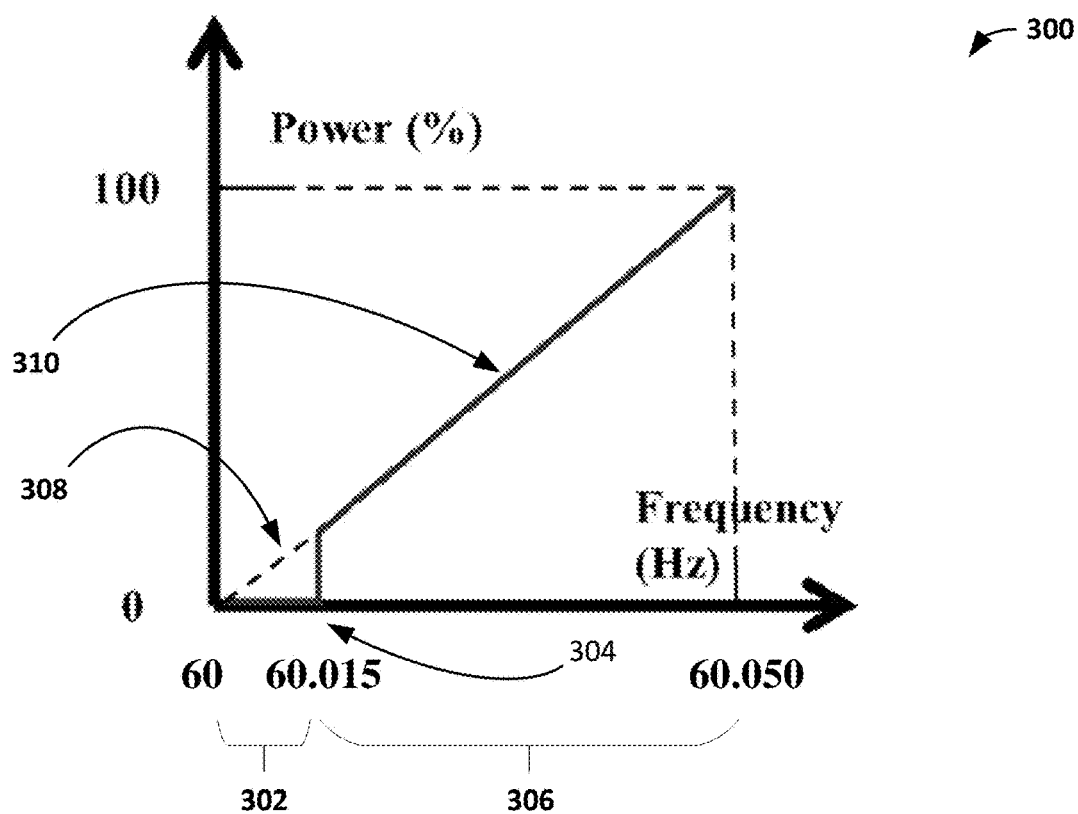
FIG. 3A is a graph illustrating a droop-like power-frequency curve in an over-frequency example.

In over-frequency examples, such as the example illustrated in FIG. 3A, the deadband bound frequency is higher than the target grid frequency and the end frequency is higher than both the deadband bound frequency and the target grid frequency. In such examples, the frequency threshold is a rising frequency threshold, and the rising frequency threshold is the grid frequency at which the grid-connected electrical device is turned on by the associated frequency-responsive load controller. Frequency deviations above the target grid frequency indicate greater generation than can be used by the current grid load.

In some examples, both a rising frequency threshold and a curtailing frequency threshold are established (along with two corresponding frequency ranges, end frequencies, and deadbands) for a controller and corresponding device, allowing the device to be used for over-frequency or under-frequency response. When both a rising frequency threshold and a curtailing frequency threshold are used, the frequency ranges, deadbands, etc. can be mirrored around the target grid frequency or determined separately (as shown, for example, in FIG. 3B).

The frequency selected for use as the frequency threshold in process block 108 can be selected, for example, using a probabilistic approach, such as random selection, to select the frequency from a group of available frequencies in the frequency range. For example, a frequency responsive load controller can randomly select a number between the end frequency and the target grid frequency. Random selection, over a large sample size, results in a uniform distribution of selected frequencies over the frequency range. An example of a large number of controllers each having a randomly selected frequency threshold is illustrated in FIG. 2A and discussed below.

Upon determining, that the frequency selected for use as the frequency threshold is within the deadband, the frequency threshold is set to a frequency within the second portion of the frequency range in process block 110. In some examples, when the selected frequency is within the deadband, the frequency threshold is set to an available frequency that is closest to the deadband bound frequency. This is illustrated in plot 200 of FIG. 2A, where many points (each representing an individual controller) are located at frequency 210. Frequency 210 is a first available frequency outside of deadband 204. For selected frequencies that are inside deadband 204, the frequency threshold is set to frequency 210 to provide a weighting to create a desired droop-like response, illustrated by power-frequency curve 222 of FIG. 2B, while still maintaining deadband 204.

As used herein, "available" means available for selection. The frequencies that are available are outside of the deadband and account for the granularity with which frequency can be specified. Frequency can be selected in increments of 0.0001 Hz, 0.001 Hz, 0.005, 0.01 Hz, or other increments. As an example, if frequency is specified/selectable in 0.005 Hz increments, even though a frequency that is 0.00000001 Hz outside of the deadband bound is closer to the deadband bound than a second frequency 0.005 Hz outside the deadband bound, the second frequency is the closest available frequency because of the 0.005 Hz frequency increments being used. In an under-frequency example, for a deadband bound frequency indicating the end of the deadband is 59.986, 59.990, etc., if the selected frequency is within the deadband, the frequency threshold can be set to 59.985, 59.980, or other value below but near the end of the deadband.

In some examples, the second portion of the frequency range comprises a third portion extending from the deadband bound to less than halfway from the deadband bound to the end frequency, and the frequency within the second portion of the frequency range to which the frequency threshold is set is within the third portion. Plot 220 of FIG. 2B illustrates a third portion 224. Third portion 224 is less than half of the size of second portion 208 and extends from just below the deadband bound frequency 206 to approximately 59.97 Hz. (In this particular example, third portion 224 is approximately a same size as deadband 204.) The frequency within the third portion used as the frequency threshold can be selected, for example, by randomly selecting one of the available frequencies within the third portion. The third portion provides a relatively narrow band (as compared to the second portion) of frequencies that can be used to adjust the frequency response curve to a more droop-like shape. In contrast to FIG. 2A in which the first available frequency is used as the threshold for the controllers for which the selected frequency for use as the threshold is within the deadband, setting the threshold to a value within third portion 224 of FIG. 2B provides a more gradual initial response to under-frequency events while still providing a droop-like response as illustrated by power-frequency curve 222.

Method 100 can further comprise upon determining that the grid frequency meets the frequency threshold, turning off (for under-frequency events) or turning on (for over-frequency events) the electrical device. In some examples, frequency of the grid voltage is measured, and the measurement is compared to the threshold. Grid current frequency can also be measured. Frequency measurement, as used herein, also includes measuring the period of a signal (which is the inverse of frequency). Measurements/comparisons can be performed periodically.

In some examples, the frequency range is determined by receiving instructions from a supervisory coordinator configured to establish the frequency range based on aggregated characteristics of a plurality of grid-connected electrical devices being managed by corresponding frequency-responsive load controllers. The aggregated characteristics can include power consumption or peak power consumption as well as an "on" or "off" status. In some examples, method 100 is performed by the supervisory coordinator, and the frequency threshold(s) are communicated to individual controllers. Supervisory coordinators are discussed further below.

FIG. 2A illustrates a plot 200 of an example distribution of approximately 1,000 devices having associated controllers. The power rating of the devices is distributed uniformly between 4 and 6 kW. Each point in plot 200 represents a device having a curtailing frequency threshold and a power rating. The frequency thresholds are uniformly distributed over second portion 208 of frequency range 202, with the exception of the many points located at frequency 210, which is the first available frequency below deadband 204. The points at frequency 210 represent controllers for which the frequency selected for use as the frequency threshold fell within deadband 204, and because deadband frequencies are not available for use as a frequency threshold, the frequency threshold for these controllers was instead set to first available frequency 210. This approach provides a weighting to create the desired droop-like response while still keeping deadband 204 unavailable for frequency thresholds.

Plot 220 of FIG. 2B illustrates droop-like power-frequency curve 222 that corresponds to the distribution shown in FIG. 2A. The x-axis of plot 220 represents frequency, and the y-axis represents a percentage of the aggregate controller-managed power that is turned off by the controllers to provide primary frequency response. As is illustrated in plot 220, due to the random distribution of frequency thresholds illustrated in FIG. 2A, the number of controllers turning off a corresponding device increases as the grid frequency drops until, at the end of second portion 208 of frequency range 202, all of the available controllers have turned their corresponding device off.

As discussed above, deadband 204 represents a frequency band in which frequency deviations are tolerated and primary frequency response is not initiated. The deadband acts to ignore noise and prevent overreactions and serves other purposes as well. In a theoretical simplification without a deadband, in which the practical reasons for using a deadband would not apply, a droop-like response in a system without a deadband would include dashed line 224, such that the droop-like response both is linear over all of frequency range 202 and reaches the 0% power, 60 Hz point on plot 220. Using the described approaches, the "weighting" provided by the many controllers for which frequency thresholds are set at first available frequency 210 (or in third portion 224) provides a step- or impulse-type response that quickly brings the power percentage to the theoretical level (meeting dotted line 224) for a frequency deviation just below deadband 204. The uniform distribution of the remaining frequency thresholds maintains the droop-like response over the remainder of frequency range 202. Thus, power-frequency curve 222 has the desired characteristic of being droop-like over frequency range 202 while also dropping to zero because of the practically desirable use of the deadband.

In contrast to the described technology, in a conventional approach, use of the deadband (e.g., deadband 204), results in a power-frequency curve 226. In power-frequency curve 226, rather than reaching 0% power at 60 Hz, 0% power is reached at deadband bound frequency 206. While power-frequency curve 226 is linear, the slope of power-frequency curve 226 differs from power-frequency curve 222 because of the different 0% power frequency, and power-frequency curve 226 is therefore not droop-like. The non-droop-like response in previous approaches is most noticeable for frequency deviations just slightly below the deadband because few controllers will be triggered as compared to the approaches shown in FIGS. 2A and 2B.

Figure 3B:
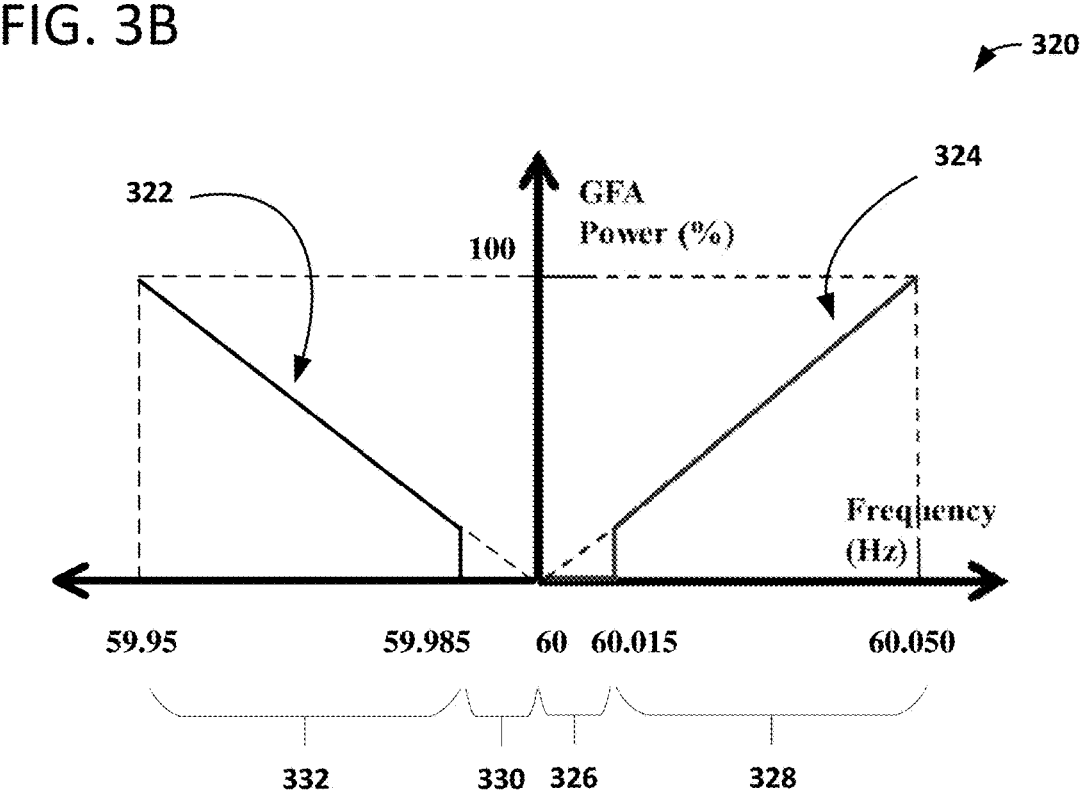
FIG. 3B is a graph illustrating droop-like power-frequency curves for an example in which controllers can be used in both over- and under-frequency situations.

FIGS. 2A and 2B illustrate an under-frequency example. FIG. 3A illustrates an over-frequency example, and FIG. 3B illustrates an example in which primary frequency response can be provided for both under- and over-frequency situations. FIG. 3A illustrates a plot 300 similar to plot 202 of FIG. 2B, except that the frequency range along the x-axis increases from left to right to represent an over-frequency example. A frequency range extends from a target grid frequency of 60 Hz to an end frequency of 60.050 Hz. A deadband 302 extends from 60 Hz to a deadband bound frequency 304. A second portion 306 of the frequency range extends from just above the deadband bound frequency 304 to the end frequency (60.050 Hz).

Rising frequency thresholds are selected from the entire frequency range (from 60 Hz to 60.050 Hz), and for controllers for which a selected frequency falls within deadband 302, the rising frequency threshold is set to a frequency within second portion 306 (e.g., a closest available frequency above deadband 302 or a frequency within a narrow frequency band extending from deadband bound frequency 304). Similar to plot 220 of FIG. 2B, no controllers activate devices for frequency deviations within deadband 302, and the number of controllers turning on a corresponding device increases as the grid frequency increases until, at the end of second portion 306, all of the available controllers have turned their corresponding device on.

Also similar to plot 220 of FIG. 2B, the "weighting" provided by the many controllers for which rising frequency thresholds are set at a first available frequency above deadband 302 (or in a narrow frequency band above deadband 302) provides a step- or impulse-type response that quickly brings the power percentage to the theoretical level (meeting dotted line 308) for a frequency deviation just above deadband 302. The uniform distribution of the remaining frequency thresholds maintains a droop-like response over the remainder of frequency range 306, as shown by power-frequency curve 310. Thus, power-frequency curve 310 has the desired characteristic of being droop-like over frequency range 306 while also dropping to zero over deadband 302 because of the practically desirable use of deadband 302.

FIG. 3B shows a plot 320 of power-frequency curves 322 and 324. Power-frequency curve 322 is an under-frequency example as shown in FIG. 2B (with the slope of power-frequency curve 322 going negative to account for the x-axis values of frequency increasing to the right, in contrast to FIG. 2B). Power-frequency curve 324 is an over-frequency example as shown in FIG. 3A. In plot 320, there is an upper (or rising) deadband 326 and an upper second portion 328 (similar to deadband 302 and second portion 306 of FIG. 3A). Upper deadband 326 and upper second portion 324 form an upper frequency range. Similarly, plot 320 includes a lower (or curtailing) deadband 330 and a lower second portion 332 (similar to deadband 204 and second portion 208 of FIG. 2B) that together form a lower frequency range. The upper frequency range is used for over-frequency primary frequency response, and the lower frequency range is used for under-frequency primary frequency response, similar to the discussion with respect to FIGS. 2A-3A. In some examples, the upper frequency range and lower frequency range are a same size and rising deadband 326 and curtailing deadband 330 are a same size. In other examples, they are determined separately, and rising deadband 326 does not necessarily correspond to curtailing deadband 330, etc.

The technology described herein was tested for an under-frequency example using the IEEE 16-machine 68-bus test system. This test system approximates the interconnection between the New England test system (NETS) and the New York power system (NYPS). There are five areas in total. Area 4 represents NETS with generators G1 to G9, and area 5 represents NYPS with generators G10 to G13. Generators G14 to G16 are equivalent aggregated generators that model the three neighboring areas connected to NYPS. The system parameters are taken from the data files that come with the Power System Toolbox (PST) distribution. The total load in the system is 18,333.90 MW with 5,039.00 MW in the NETS (area 4) and 7,800.95 MW in the NYPS (area 5). The total load of online GFAs is 800 MW, which are evenly distributed among areas 4 and 5. The controllers in these studies are selected to be electric water heaters. The curtailment time delay $t_{d\_c}$ is selected to be 0.4 seconds for the hardware implementation. The activation time delay $t_{d\_a}$ is randomly chosen between 2 and 3 minutes.

Two scenarios were considered. In the first scenario, the system responses in four situations are compared when the system is subject to small disturbances. The under-frequency event considered here is the tripping of generator G1. Since the power output of generator G1 is small, the resulting frequency deviation is so small that the lowest frequency is within the range of 59.95 Hz and 59.985 Hz. In the second scenario, the comparison between the system responses in four different situations is performed again when the system is subject to a large disturbance. The under-frequency event in this case study is the tripping of generator G12, which has large power output before the tripping occurs. In both scenarios, primary frequency response using the described technology was very close to the desired droop-like situation.

Example Controllers and Controller Operation

Figure 4:
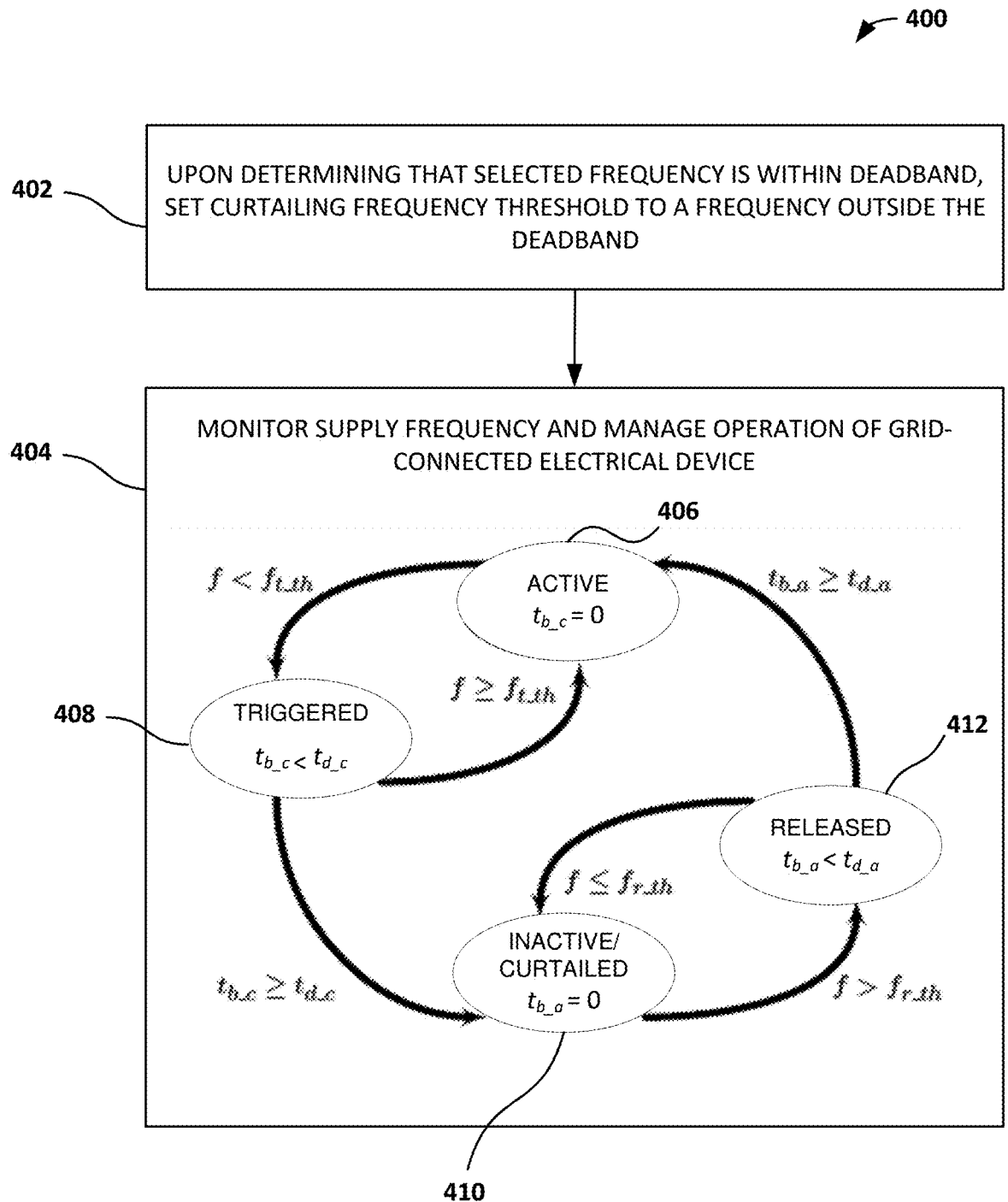
FIG. 4 is a flow chart illustrating an example method of managing a grid-connected electrical device using a selected curtailing frequency threshold.

FIG. 4 shows an example operational flow 400 for a controller implemented in an under-frequency example. In process block 402, upon determining that a frequency selected for use as a curtailing frequency threshold is within the deadband (e.g., as in process block 108 of FIG. 1), the curtailing frequency threshold is set to a frequency outside the deadband (e.g., a first available frequency). In process block 404, grid frequency is monitored and operation of a grid-connected electrical device is managed. In some examples, individual controllers have four different operating modes including active 406, triggered 408, curtailed 410, and released 412. In the active operating mode 406, the individual controller evolves based on its internal dynamics, turning ON or OFF according to its predefined control logic. Once the controller detects that the grid frequency falls below a predetermined curtailing frequency threshold $f_{t\_th}$, the controller changes its operating mode from active 406 to triggered 408. The controller remains in this mode as long as the grid frequency does not return above $f_{t\_th}$. A time $t_{b\_a}$ is the time the device has been in the released mode, and a time $t_{b\_c}$ is the time the device has been in the triggered mode.

If the under-frequency event persists longer than the response time $t_{d\_c}$ (curtailment time delay) of the controller, the device shuts down and switches from triggered 408 to curtailed 410. The time period of $t_{d\_c}$ is defined by the response time of a low-pass digital filter in charge of smoothing the frequency measurements in order to avoid reactions to unrealistic data and noise. Once the grid frequency rises above a predetermined restoring frequency threshold $f_{r\_th}$, where $f_{r\_th} > f_{t\_th}$, the controller switches from curtailed 410 to released 412 and remains in this mode provided the grid frequency stays above $f_{r\_th}$. If it has been released for a period of time longer than $t_{d\_a}$, the controller switches from released 412 to active 406, and follows its nominal internal dynamics. The activation time delay $t_{d\_a}$ is designed in order to minimize or reduce the rebound effect when all the controllers would turn on at the same time.

Figure 5:
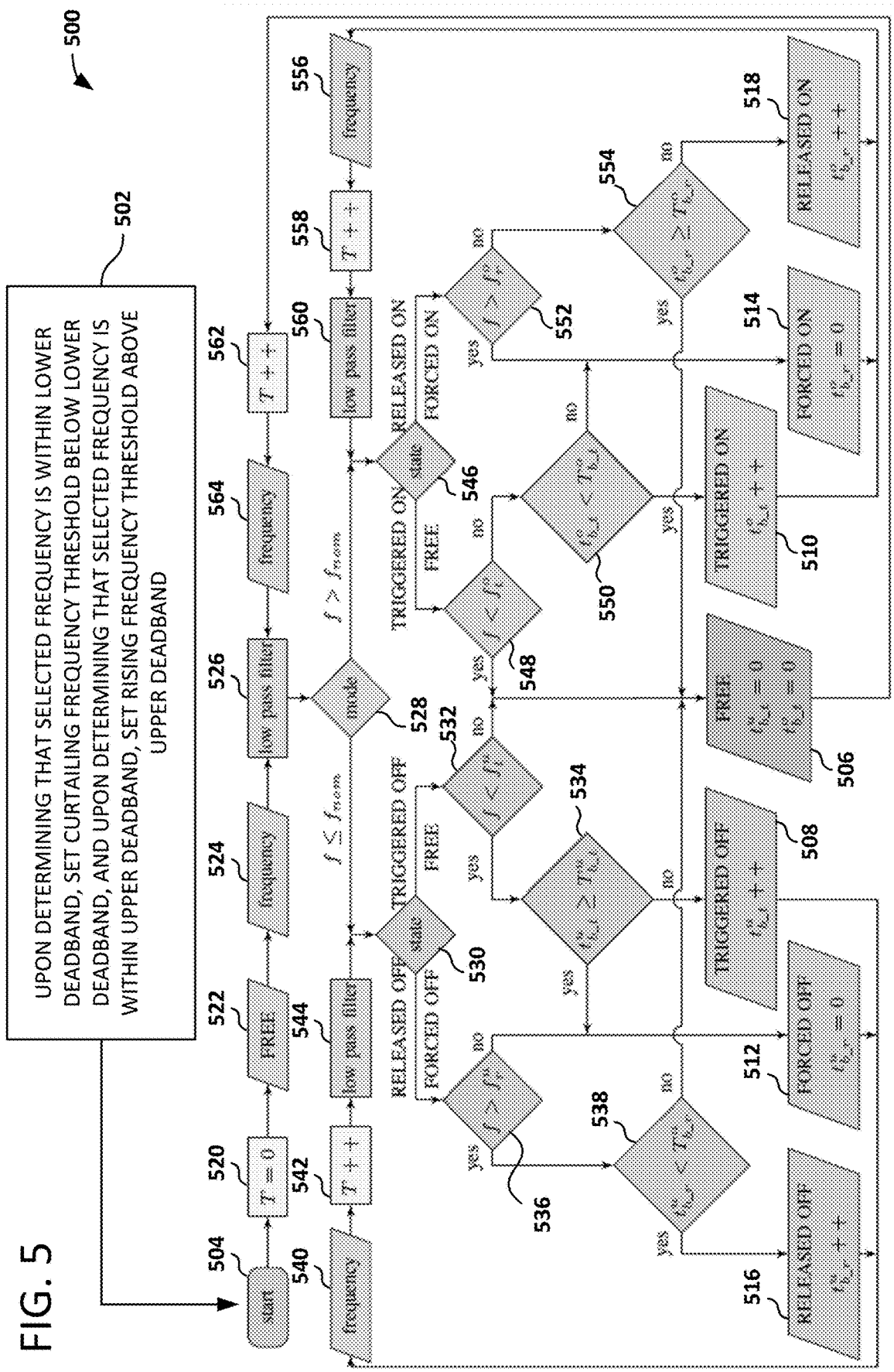
FIG. 5 is a flow chart illustrating an example method of managing a grid-connected electrical device using a selected curtailing frequency threshold and a selected rising frequency threshold.

FIG. 5 includes flow chart 500 that illustrates an example operation of a controller capable of providing primary frequency response for both over- and under-frequency events. In process block 502, if a selected frequency is within a lower deadband (curtailing deadband), then the curtailing frequency threshold is set below the lower deadband, and if a selected frequency is within an upper deadband (rising deadband), then the rising frequency threshold is set above the upper deadband. Frequency monitoring begins in process block 504.

Functionally, each individual controller has two different operating modes—under-frequency ($f \le 60$ Hz) and over-frequency ($f > 60$ Hz) modes (where 60 Hz is the nominal (target) frequency $f_{nom}$). In the under-frequency mode, the controller reacts to the under-frequency events. In the over-frequency mode, it reacts to the over-frequency events. In some examples, at any given time instant, the controller can only be operated in one mode, which is determined and changed according to the local frequency measurement. Furthermore, two operating modes can be further divided into seven different states including free 506, triggered off 508, triggered on 510, forced off 512, forced on 514, released off 516, and released on 518. In the state of free 506, the controller evolves based on their internal dynamics, turning ON or OFF according to their predefined internal control.

In process block 520, time is set to zero, and in process block 522, the initial state of the controller is set to free 506. The grid frequency is measured in process block 524 and provided to a low-pass filter in process block 526, and if the result indicates a frequency deviation, an operating mode (over- or under-frequency) is determined in process block 528. If the measured frequency is less than a target frequency, then a current state is set through process block 530 by way of process blocks 532, 534, 536, and/or 538. In process block 532, if the grid frequency falls below a predetermined curtailing frequency threshold $f_t^u$, the controller changes its operating state from free 506 to trigger off 508. If, in process block 534, the time of the frequency event $t_{b\_t}^u$ persists longer than the response time $T_{b\_t}^u$, the controller shuts down the device and switches it from triggered off 508 to force off 512. The time period of $T_{b\_t}^u$ is defined by a low-pass filter (e.g., a digital low-pass filter, applied in process blocks 526, 544, and/or 560) in charge of smoothing the frequency measurements to avoid reactions to unrealistic data and noise.

Once the grid frequency rises above a predetermined restoring frequency threshold $f_r^u$ in process block 536, where $f_r^u > f_t^u$, the controller switches from forced off 512 to released off 516. The controller remains in this state, given that the frequency stays above $f_r^u$. If the controller has been in the state of released off 516 for a longer time $t_{b\_r}^u$, than the release time delay $T_{b\_r}^u$ as determined in process block 538, the controller switches its state back to free 506 and follows its nominal internal dynamics. The release time delay $T_{b\_r}^u$ is designed for the purpose of preventing the rebound effect that occurs when all the controllers try to return to their normal operations at the same time. Frequency is determined in process block 540, time is incremented in process block 542, and a low-pass filter is applied in process block 544 to prepare the most recent frequency measurement obtained in process block 540 for another iteration through process blocks 530-538.

If the measured frequency is greater than a target frequency (over-frequency event), then a current state is set through process block 546 by way of process blocks 548, 550, 552, and/or 554. In process block 548, if the grid frequency rises above a predetermined rising frequency threshold $f_t^o$, the controller changes its operating state from free 506 to trigger on 510. If, in process block 550, the time of the frequency event $t_{b\_t}^o$ persists longer than the response time $T_{b\_t}^o$, the controller turns on the device and switches it from triggered on 510 to forced on 514. The time period of $T_{b\_t}^o$ is defined by a low-pass filter in charge of smoothing the frequency measurements to avoid reactions to unrealistic data and noise.

Once the grid frequency rises above a predetermined restoring frequency threshold $f_r^o$ in process block 552, where $f_r^o < f_t^o$, the controller switches from forced on 514 to released on 518. The controller remains in this state, given that the frequency stays below $f_r^o$. If the controller has been in the state of released on 518 for a longer time $t_{b\_r}^o$ than the release time delay $T_{b\_r}^o$ as determined in process block 554, the controller switches its state back to free 506 and follows its nominal internal dynamics. The release time delay $T_{b\_r}^o$ is designed for the purpose of preventing the rebound effect that occurs when all the controllers try to return to their normal operations at the same time. Frequency is determined in process block 556, time is incremented in process block 558, and a low-pass filter is applied in process block 560 to prepare the most recent frequency measurement obtained in process block 556 for another iteration through process blocks 548-554. In some examples, the low-pass filter applied in process blocks 526, 544 and 560 are the same filter. From free state 506, time is incremented in process block 562, frequency is measured in process block 564, a low-pass filter is applied in process block 526, and a decision is again made in process block 528 as to whether to enter an under- or over-frequency mode.

Two under-frequency examples follow (similar examples can be constructed for the case of over-frequency events). A controller starts out in the state of free when the frequency starts to dip. When the frequency drops below the curtailing frequency threshold $f_t^u$, the controller changes its state to triggered off. Then, the frequency is restored above the restoring frequency threshold $f_r^u$ within the response time $T_{b\_t}^u$, so the controller changes its state back to free resuming the normal operation.

In a second example, the controller also starts in the state of free. When the frequency drops below the frequency threshold $f_t^u$, the controller changes its state to triggered off. In this case, the frequency is not restored above the frequency threshold $f_r^u$ within the response time $T_{b\_t}^u$, so the controller changes its state to forced off. The controller stays in the state of forced off until the frequency is restored above the frequency threshold $f_r^u$, and then changes its state to released off. However, the frequency does not stay above $f_r^u$ for enough time, so the controller changes its state back to forced off. After some time, the frequency returns above $f_r^u$ again and the controller changes its state to released off. Finally, the frequency stays above the $f_r^u$ for a longer time than the release time $T_{b\_r}^u$, so the controller changes its state to free resuming the normal operation.

Figure 6:
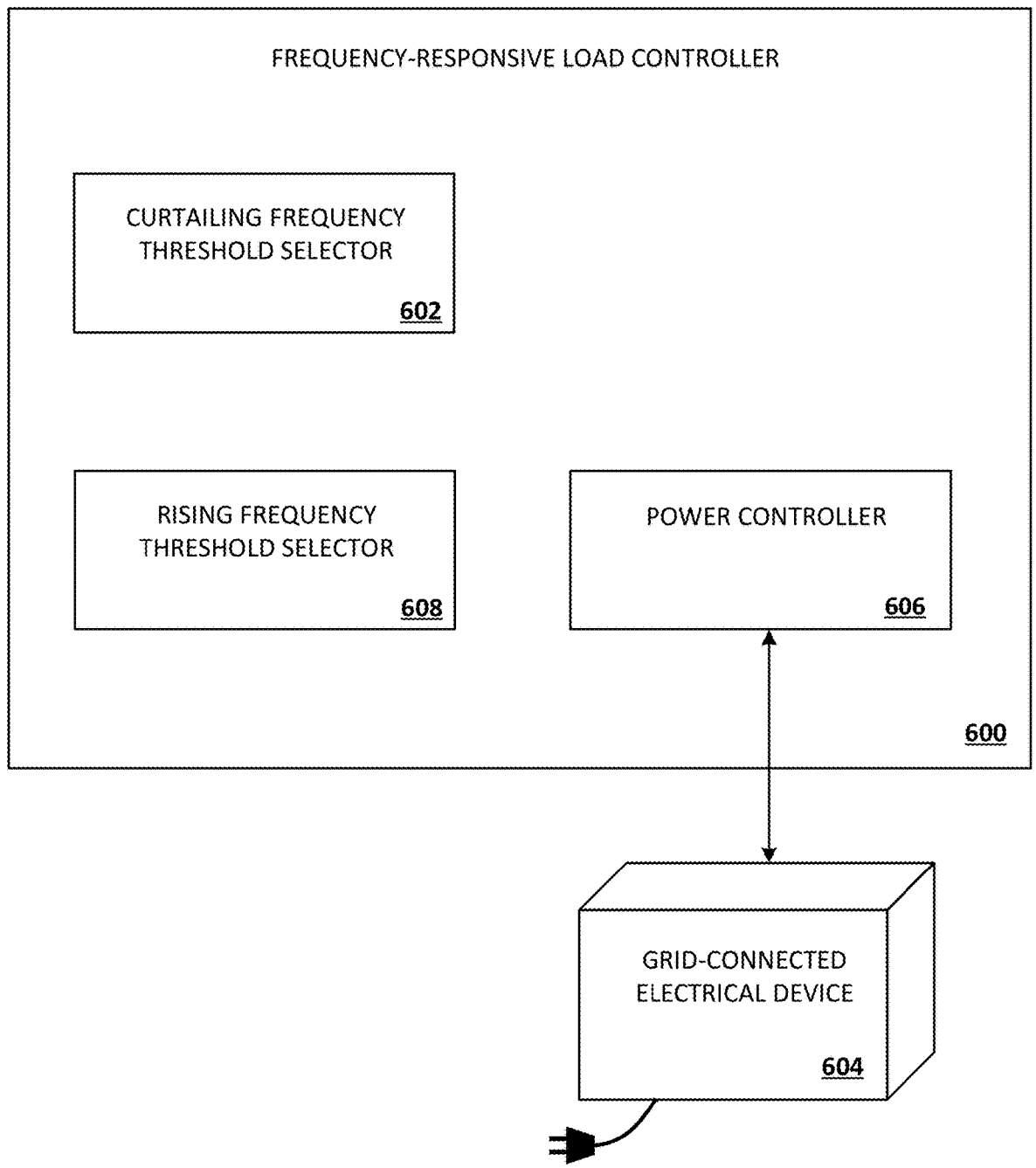
FIG. 6 is a block diagram of an example frequency-responsive load controller.

FIG. 6 illustrates a frequency-responsive load controller 600. Controller 600 includes a curtailing frequency threshold selector 602 implemented by computing hardware. The computing hardware can include a programmable logic device such as a field programmable gate array (FPGA), an application-specific integrated circuit (ASIC), and/or one or more processors and memory. Curtailing frequency threshold selector 602 is configured or programmed to select a frequency from a frequency range for use as a curtailing frequency threshold. The frequency range can be stored in the computing hardware (e.g., stored in memory). The curtailing frequency threshold is a grid frequency at or below which a grid-connected electrical device 604 associated with frequency-responsive load controller 600 is turned off.

Curtailing frequency threshold selector 602 is further configured or programmed to, upon determining that the frequency selected for use as the curtailing frequency threshold is within an under-frequency deadband of the frequency range, set the curtailing frequency threshold to a frequency lower than the under-frequency deadband but within the frequency range. The under-frequency deadband (also referred to as the lower deadband or curtailing deadband) is a frequency range over which the grid-connected electrical device is not turned off (and remains on if already on) by the frequency-responsive load controller. Curtailing frequency threshold selector 602 can be configured or programmed to perform any of the frequency threshold selection approaches described herein, including those discussed with respect to FIGS. 1-5.

Frequency-responsive load controller 600 also includes a power controller 606 implemented by the computing hardware. Power controller 606 is configured or programmed to monitor the grid frequency at grid-connected electrical device 604, and, upon determining that the grid frequency meets or falls below the curtailing frequency threshold, initiate a powering off of grid-connected electrical device 604. Power controller 606 can include a voltmeter, ammeter, or other measurement device. Power controller 606 can interface directly with a power supply circuit (e.g., a switch) of grid-connected electrical device 604 or can transmit a power control signal to a different circuit or component of grid-connected electrical device 604.

In some examples, the frequency lower than the under-frequency deadband but within the frequency range that is set as the curtailing frequency threshold is a first available frequency lower than the under-frequency deadband. In other examples, a second, third, or other available frequency lower than the under-frequency deadband is used. In still other examples, the frequency set as the curtailing frequency threshold is selected from a narrow frequency band lower than the deadband (e.g., less than half of the range from the end of the under-frequency deadband to the end of the frequency range).

Controller 600 can also comprise a rising frequency threshold selector 608 implemented by the computing hardware. Rising frequency threshold selector 608 is configured or programmed to select a second frequency from a second frequency range for use as a rising frequency threshold. The rising frequency threshold is a grid frequency at or above which grid-connected electrical device 604 is turned on. Rising frequency threshold selector 608 is further configured or programmed to, upon determining that the second frequency is within an over-frequency deadband of the second frequency range, set the rising frequency threshold to a frequency higher than the over-frequency deadband but within the second frequency range. The over-frequency deadband (also referred to as the upper deadband or rising deadband) is a frequency range over which grid-connected electrical device 604 is not turned on by frequency-responsive load controller 600. In examples in which rising frequency threshold selector 608 is present, power controller 606 is further configured or programmed to, upon determining that the grid frequency meets or rises above the rising frequency threshold, initiate a powering on of grid-connected electrical device 604.

In some examples, the frequency higher than the over-frequency deadband but within the frequency range that is set as the rising frequency threshold is a first available frequency higher than the over-frequency deadband. In other examples, the frequency set as the rising frequency threshold is selected from a narrow frequency band higher than the deadband (e.g., less than half of the range from the end of the over-frequency deadband to the end of the frequency range). Frequency-responsive load controller 600 can include curtailing frequency threshold selector 602 and not rising frequency threshold selector 608, rising frequency threshold selector 608 and not curtailing frequency threshold selector 602, or both curtailing frequency threshold selector 602 and rising frequency threshold selector 608.

Example Hardware Configurations

In an example computing hardware configuration of an under-frequency frequency-responsive load controller, a 5-cm×7.5-cm (2-in.×3-in.) digital electronic controller board is used. The digital intelligence is based on an Altera FPGA. Inputs to the controller board include 5 V DC, which is used to power the board, and a 24 V AC voltage-sensing input from a voltage transformer that is used to sense grid frequency of a grid-connected electrical device's 120 or 240 V AC electric service. The AC signal is conditioned by a series of comparators that convert the AC sinusoid into a square wave signal having fast rise and fall times. The period of the resulting 60 Hz square wave is measured using the pulse count from a 7.2 MHz crystal oscillator reference. Outputs of the controller board consist of several digital outputs, the characteristics and meanings of which can be assigned by firmware. In this example, only the "relay control" signal is passed along to the controlled electrical device. This signal is pulled to its low logic state while a curtailment response was being requested from the controlled electrical device. Remaining output pins are assigned to facilitate testing and troubleshooting, but these additional signals are not used for device control in this example.

In this example, the output of the controller is a binary signal. Grid-connected electrical device load current does not flow through any part of the controller board. In examples in which the electrical device is an electric water heater, the binary output signals can be used to control relay switches in the control modules for water-heater loads. In examples in which the electrical device is a clothes dryer, optically isolated versions of the controllers' output signals can be sent to the dryer's communication processors, where they can be translated into the dryer's proprietary serial protocol and sent to and understood by the dryer's microcontrollers.

Figure 7:
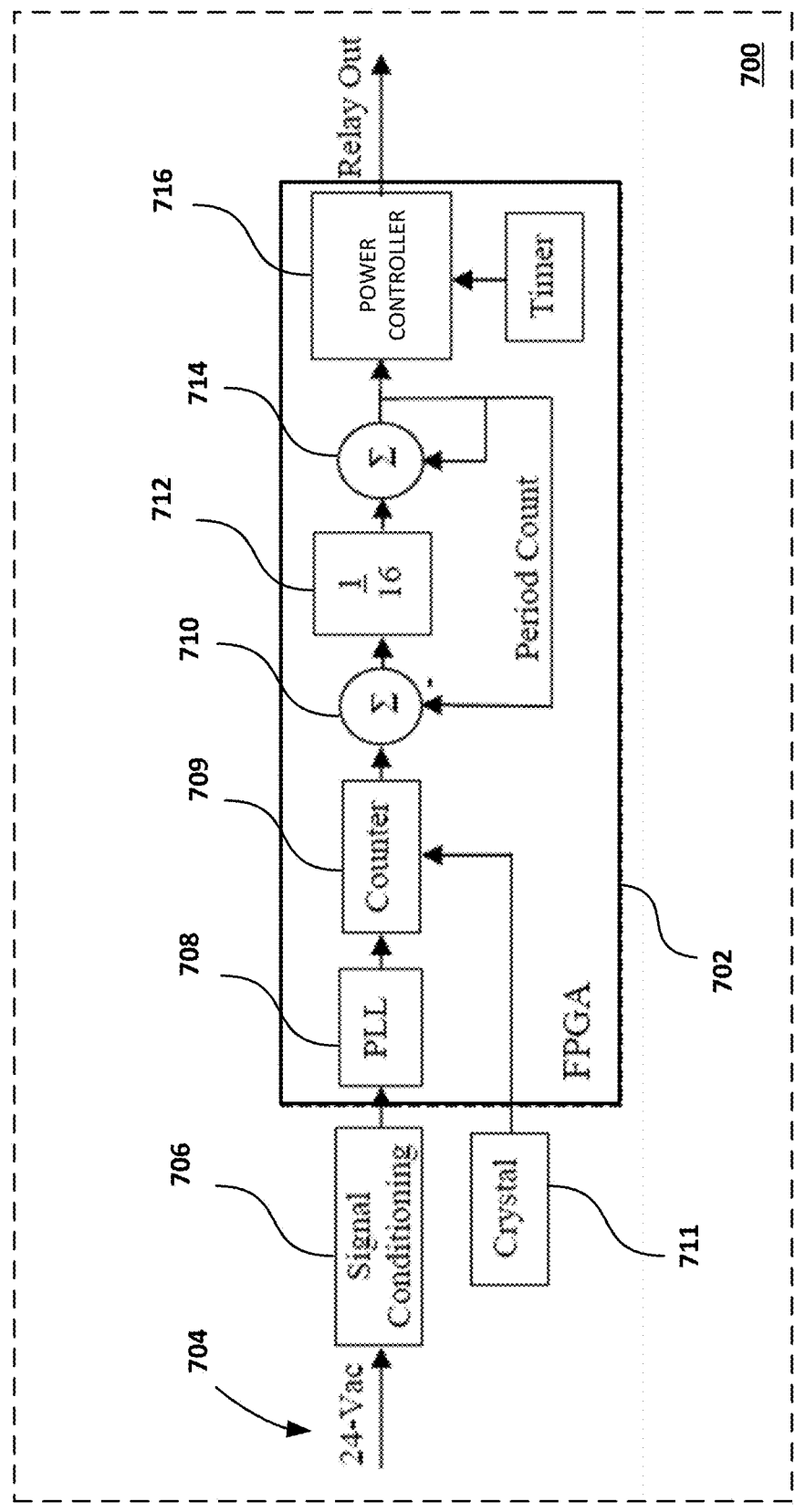
FIG. 7 is a block diagram of an example frequency-responsive load controller implemented using a field programmable gate array (FPGA).

Portions of an example controller 700 are illustrated in FIG. 7. FPGA 702 can be or can be similar to an Altera EPM7128BTC100-10 FPGA. This FPGA embodiment is by way of example only, as other circuits or processing devices can be used, such as application specific integrated circuits (ASICs) or microprocessors executing suitable instructions for performing the disclosed functions. In the example of FIG. 7, a hardware gate design approach is used to achieve an efficient implementation using the limited number of macro cells of FPGA 702. In some examples, controller 700 determines frequency by measuring the period of an input signal 704. Input signal 704 is stepped-down to 24 V AC from an, e.g., 120 or 240 V, AC voltage. The period of the signal is the reciprocal of the signal's frequency. A signal conditioning stage 706 can include, for example, a series of comparators. The conditioned 60 or 50 Hz square wave from the power grid is an input to a phase locked loop (PLL) 708 that is implemented using FPGA 702. PLL 708 removes jitter from the period measurement and prevents logic confusions that can occur when multiple zero crossings occur in noisy device electrical environments. The period of the output of PLL 708 is measured at counter 709 using a pulse count from an (e.g., 7.2 MHz) crystal oscillator 711 reference.

A difference is taken in summation stage 710 between the period measured using PLL 708 and counter 709 and the present reported period of controller 700 (the negative of the period count is summed with the measured period, resulting in a difference). This difference is an error signal. The error signal is then divided by an integer in stage 712 to create a low-pass filtered tracking of the actual frequency. In some examples, the divisor 16 is used, but any other divisor can be used and is within the scope of the disclosed technology. This divisor removes the responses to high-frequency noise, but it also slows the response to legitimate changes, as is typical for low-pass filtering. The result of this division (an attenuated error signal) in stage 712 is then added to the reported period in summation stage 714. The reported period is then digitally compared against thresholds by power controller 716, which can be similar to power controller 608 of FIG. 6, to determine the state of an output-control signal. FPGA 702 is also used to implement at least one of a curtailing threshold frequency selector (not shown) or rising threshold frequency selector (not shown) that can be similar to the corresponding components in FIG. 6.

Frequency Range Determination Examples and Examples of Supervised Arrangements

The frequency threshold selection technologies described herein can also be used in a hierarchical decentralized control strategy for engaging the end-use loads to provide primary frequency response. In some examples, two decision-making layers including supervisory and device layers, are used. Additional decision-making layers can also be used. Frequency-responsive load controllers at the device layer can still be operated in an autonomous fashion to provide a quick response while a coordinator at the supervisory layer coordinates the autonomous responses to overcome the stability issue associated with high penetration of controllers. These approaches provide an aggregated response that is droop-like without over-responding to frequency deviations due to high controller penetration. Simulation results illustrate the effectiveness of such a hierarchical decentralized control strategy in providing primary frequency response using controllers associated with grid-connected electrical devices.

Figure 8:
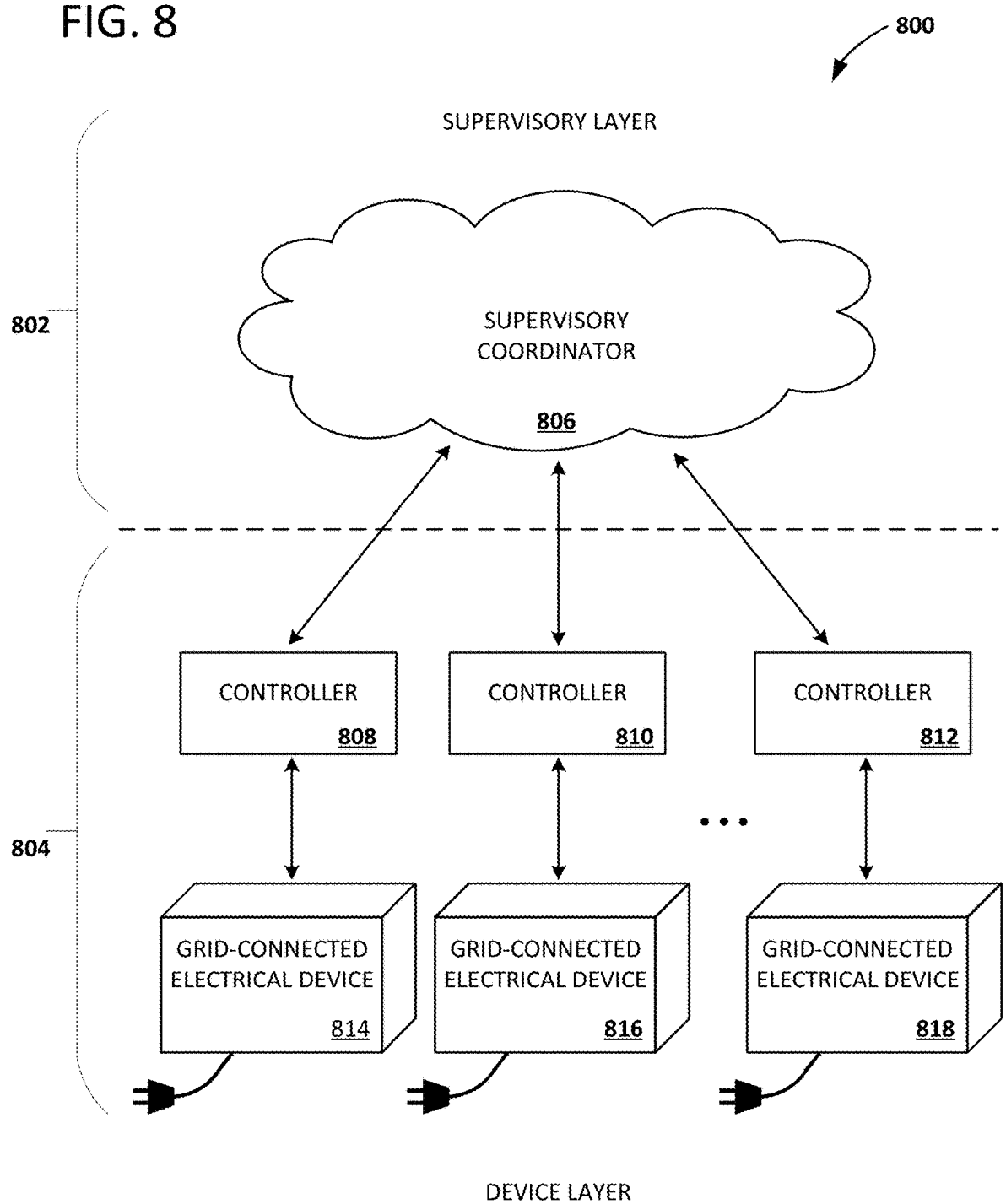
FIG. 8 is a block diagram of an example hierarchical power grid management system in which a supervisory controller communicates with individual frequency-responsive load controllers.

FIG. 8 illustrates a hierarchical decentralized arrangement 800 that includes two decision-making layers—a supervisory layer 802 and a device layer 804. In supervisory layer 802, a supervisory coordinator 806 is responsible for ensuring that an aggregated response from engaged controllers is droop-like during frequency events and preventing the aggregated response from being excessive under high penetration of controllers. Supervisory coordinator 806 can be, for example, implemented on one or more server computers in the cloud or on a particular computing device or devices accessible over a network such as the Internet. In some examples, additional intermediate decision-making layers are present.

Supervisory coordinator 806 communicates with controllers 808, 810, and 812. Controllers 808, 810, and 812 are associated with grid-connected electrical devices 814, 816, and 818, respectively. Communication between supervisory coordinator 806 and controllers 808, 810, and 812 can occur, for example, once every control period (e.g., once every 5, 10, 15, 30, or 60 min, etc.) and/or after a request has been sent by or received by supervisory coordinator 806 based on non-time-based criteria (e.g., total system load, total available generation, historical frequency deviation information, etc.). Communication can occur, for example, over the Internet or other computer network, over a cellular network, through power line communication (PLC), or through other approaches.

In examples in which periodic communication is used, the length of the control period can be selected based on the characteristics of controllers 808, 810, and 812 and/or based on historical frequency deviation information, characteristics of the grid, or other factors. Controllers 808, 810, and 812 submit power information, including power rating (in kW) and power mode (ON or OFF), to supervisory coordinator 806 at the beginning of each control period or upon request. After collecting the power information, supervisory coordinator 806 divides controllers 808, 810, and 812 (as well as other available controllers) into two groups. The ON group consists of those controllers that are currently ON and will provide under-frequency response. The OFF group consists of those controllers that are OFF and will provide over-frequency response. Supervisory coordinator 806 then calculates the total aggregated power of each group, $P_{max}$ and selects the desired droop value R for each group based on the corresponding magnitude of $P_{max}$. This is illustrated in FIG. 9.

Figure 9:
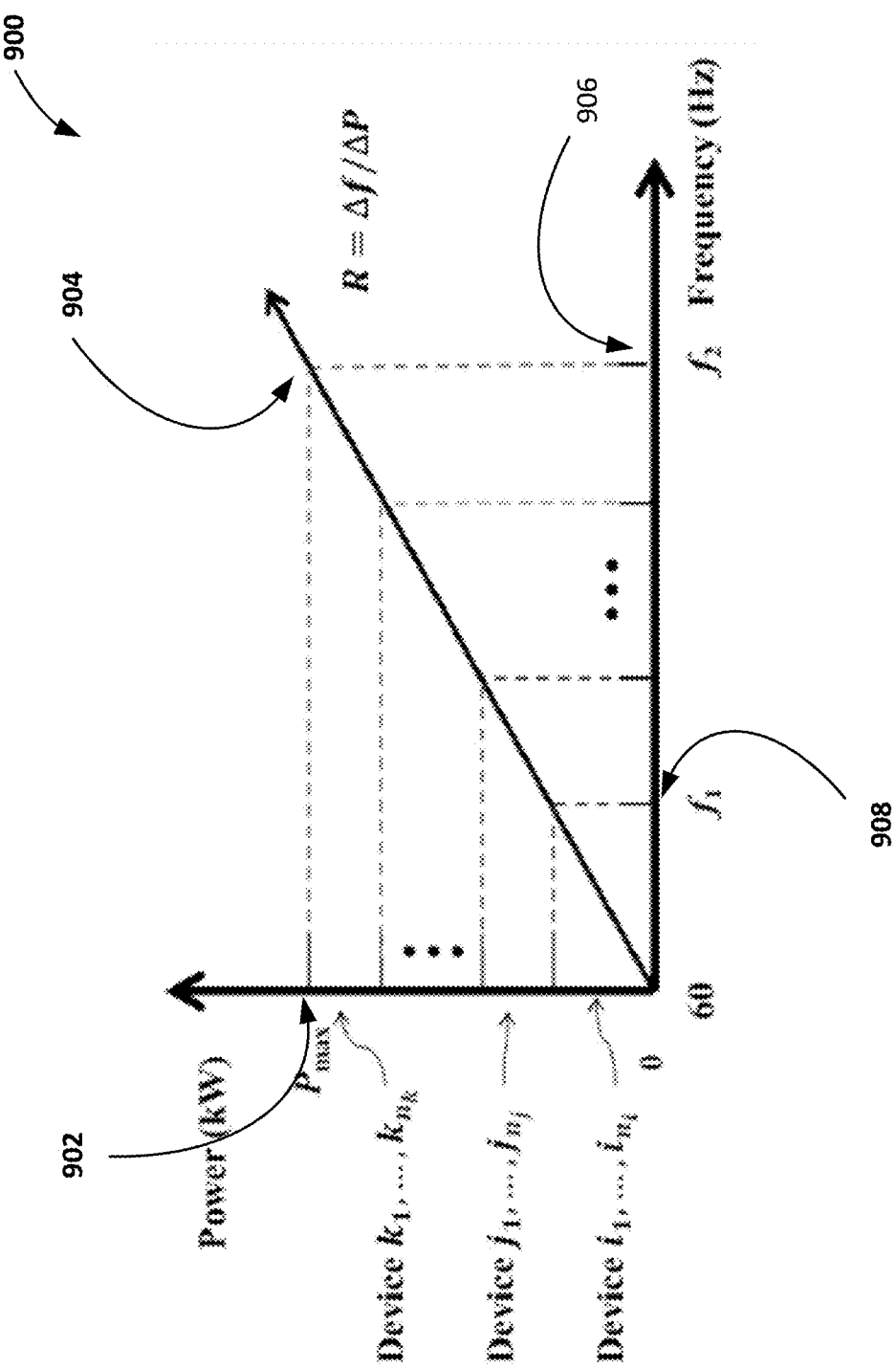
FIG. 9 is a block diagram of an example target power-frequency curve.

FIG. 9 shows a graph 900 of power vs. frequency. Desired droop R is calculated as the change in frequency divided by change in power. As an example, for an aggregated amount of power 902 ($P_{max}$), a horizontal line is determined to a point 904 on the desired droop curve. A vertical line is then determined down to identify the corresponding boundary frequency 906 ($f_2$) that indicates the end of the frequency range available for use as frequency thresholds. A deadband bound frequency 908 ($f_1$) is also shown. In some examples, deadband bound frequency 908 is a fixed value, and in other examples, deadband bound frequency 908 is adjusted periodically (and in some examples every control period) based on historical frequency events, grid performance, or other factors. For different values of $P_{max}$, the desired droop curve can similarly be used to identify a boundary frequency.

Returning now to FIG. 8, supervisory coordinator 806 communicates information to individual controllers 808, 810, and 812 based on the aggregated power information. In some examples, supervisory coordinator 806 determines the frequency range(s) from which frequency thresholds can be selected and communicates the range(s) to controllers 808, 810, and 812. Controllers 808, 810, and 812 then select frequency thresholds from the ranges and monitor the grid locally. The boundary frequency (e.g., $f_2$ from FIG. 9) can be communicated, and in some examples, the deadband bound frequency is also communicated. In a periodic update example, supervisory coordinator 806 receives current power information, determines new frequency ranges (e.g., as illustrated in FIG. 9), and communicates the new ranges back to controllers 808, 810, and 812. Controllers 808, 810, and 812 continue to operate autonomously, but each control period the controllers receive an updated frequency range and select a new frequency threshold from the updated range.

In other examples, supervisory coordinator 806 both determines the frequency range(s) and (e.g., randomly) selects frequency thresholds from the range(s) and communicates the selected thresholds to individual controllers. Supervisory coordinator 806 can account for the power of the loads associated with the controllers. For example, frequency thresholds can be assigned to particular controllers based on the associated power of the load to help maintain a linear response.

In decentralized hierarchical arrangement 800, by determining $f_2$ indirectly through the selection of R (e.g., as shown in FIG. 9), the maximum frequency deviation responded to becomes dependent on the penetration level of controllers, which effectively overcomes the issue of excessive response under high controller penetration. In some examples, multiple supervisory coordinators are used, each coordinator supervising a feeder, substation, or other grid unit. In other examples, a single supervisory coordinator is used for the entire grid. Decentralized hierarchical arrangements were tested using the IEEE 16-machine 68-bus test system. The system parameters were taken from the data files that come with the Power System Toolbox (PST) distribution. The total load in the system was 18,333.90 MW with 5,039.00 MW in area 4 and 7,800.95 MW in area 5. The controllers are selected to be electric water heaters, which are evenly distributed among area 4 and 5. The response time delay $T_{b_t}^u$ and $T_{b_t}^o$ were selected to be 0.4 seconds, while the release time delay $T_{b_r}^u$ and $T_{b_r}^o$ were randomly chosen between two and three minutes.

Two example scenarios were investigated. In the first scenario, load bus 7 was tripped to create an over-frequency event. Two different penetration levels of controllers (400 MW and 2700 MW) were simulated. A plot of rotor speed responses indicates that the decentralized control strategy (without a supervisory coordinator) greatly improves the primary frequency response when the penetration level of controllers is low. However, as the penetration level increases, excessive response from controllers negatively impacts the system response when the penetration level is high. By taking a hierarchical decentralized control approach to controllers under high penetration, the excessive response was effectively avoided through the coordination of the supervisory coordinator.

In the second scenario, generator G1 was tripped to create an under-frequency event and repeat the same simulation scenarios as the first scenario. Simulation results indicate a similar advantage (as in the first scenario) of hierarchical decentralized control over a decentralized control strategy without supervision.

Figure 10:
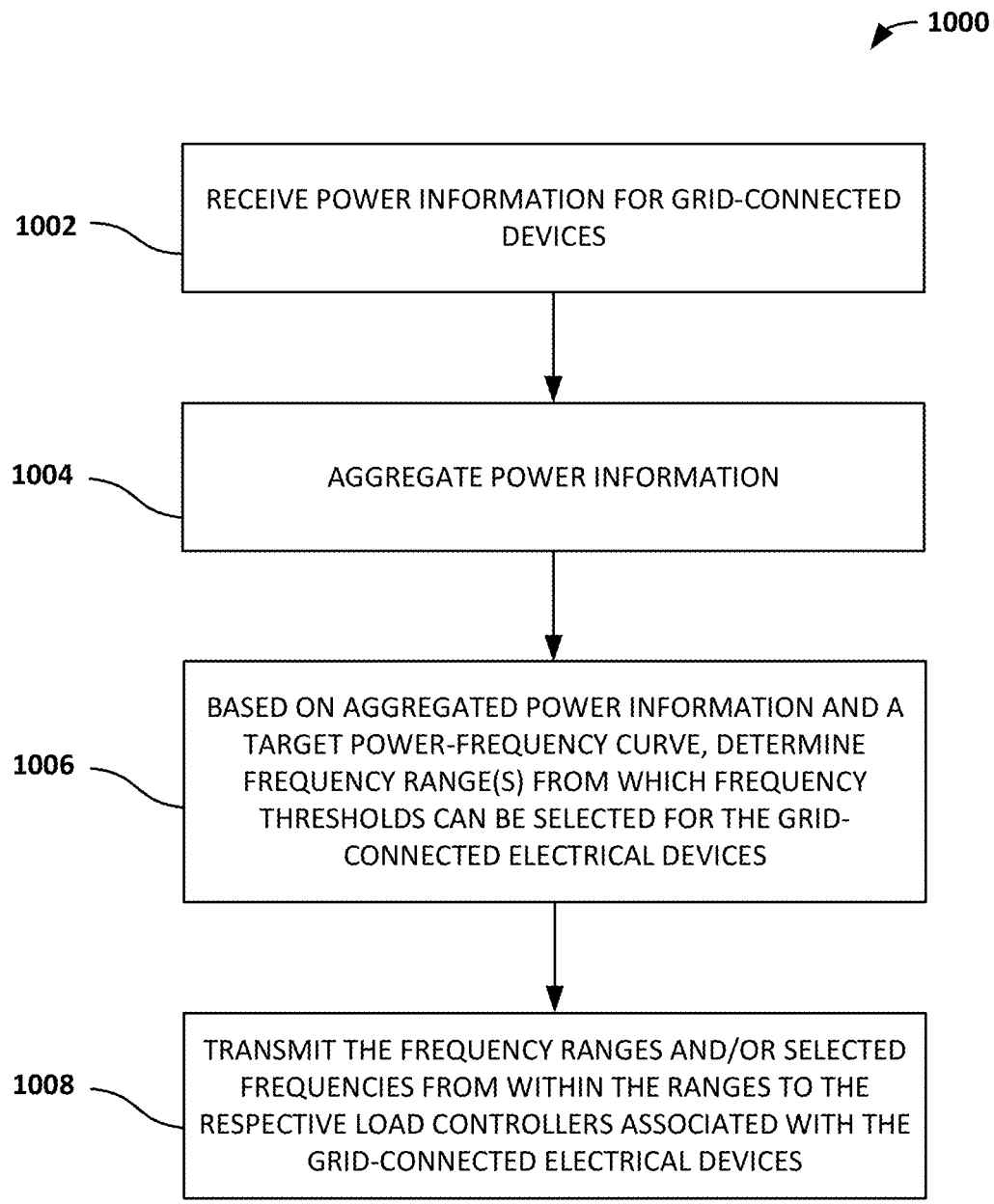
FIG. 10 is a diagram illustrating an example method of managing frequency response in an electrical power distribution system using grid-connected electrical devices.

FIG. 10 illustrates an example method 1000 of managing frequency response in an electrical power distribution system. Method 1000 can be performed, for example, by a supervisory coordinator such as supervisory coordinator 806 of FIG. 8. In process block 1002, power information is received for a plurality of grid-connected electrical devices. The power information can include a power load rating (e.g., in kWh) and can also include an on-or-off status. Power information can be reported by individual controllers in response to a request from a supervisory coordinator or reporting can be initiated by the individual controllers (e.g., periodically). The received power information is aggregated in process block 1004.

Based on the aggregated power information and a target power-frequency curve, one or more frequency ranges from which frequency thresholds can be selected for the respective grid-connected electrical devices are determined in process block 1006. For a respective grid-connected electrical device, the frequency threshold is a grid frequency at which the grid-connected electrical device is automatically turned off or turned on by an associated frequency-responsive load controller. The target power-frequency curve can be a desired droop or droop-like response as illustrated in FIG. 9. In some examples, process block 1006 further comprises determining an under-frequency range from which curtailing frequency thresholds can be selected and determining an over-frequency range from which rising frequency thresholds can be selected.

In process block 1008, at least one of (i) the one or more frequency ranges or (ii) one or more selected frequencies within the one or more frequency ranges are transmitted to the respective frequency-responsive load controllers associated with the respective grid-connected electrical devices. In some examples, the receiving, aggregating, and transmitting are performed periodically (e.g., every 5, 10, 15, 30, or 60 min, etc.). The frequency ranges or selected frequencies transmitted in process block 1008 can be transmitted over a computer network, such as the Internet, over a cellular network, using PLC, or through other approaches from a supervisory coordinator to the individual frequency-responsive load controllers associated with the grid-connected electrical devices.

In some examples in which multiple supervisory coordinators are used, after collecting power ratings of controllers at the beginning of each control period, supervisors located at different feeders can use information discovery approaches to determine the total power of online controllers in the system. For example, the supervisors can run consensus algorithms by exchanging the current power of online controllers under their supervision with neighboring supervisors. Once the total power of online controllers is known, each supervisor can determine a new range accordingly and then broadcast the range to the supervised controllers, which can randomly pick a frequency threshold from the new range.

Additional Examples

Various market mechanisms can be used to further penetration of frequency-responsive load controllers into the grid. In such examples, a supervisory coordinator can collect additional information from the controllers, including device states other than on/off and/or a "willingness" or priority factor. The willingness factor can be based on an expressed user preference (e.g., an amount or relative amount of device management the user is willing to tolerate) or it can be based on device states. For example, if a water heater is nearly finished returning to a set temperature, which indicates that a person using the water heater may not be inconvenienced much by the water heater being turned off to manage grid frequency, a higher willingness factor can be sent to the supervisory coordinator. Conversely, if a water heater has just started bringing the temperature of the water up from a low value toward a target, a lower willingness factor can be sent. Controllers with a high willingness factor can be used before other controllers to manage frequency response. The willingness factor can be, for example, a number between 1 and 10, 1 and 100, 0 and 1, a letter between "a" and "z," etc.

Rewards can be provided to users based on the willingness factor. In examples in which the willingness factor is based on a device state, a lower reward can be provided to a user with a high device-based willingness factor. Continuing the water heater example, if the water heater were about to shut off anyway, allowing the controller to shut the device off is not highly rewarded, whereas if the water heater were just beginning to heat, shutting off the water heater may be a large inconvenience to a user, and allowing the controller to shut the device off is rewarded. The willingness factor reflects these device states and is used to adjust how much reward a user receives. As another example, if a user specifies a high willingness to have the controller shut off the user's device regardless of state, then the user's device can be shut off before others, and if the current device state is one that would not normally be rewarded highly, the user can still receive a larger reward for effectively volunteering via the user's expressed preference. Rewards can be, for example, usage or bill credits or lower kWh rates.

The described market mechanisms can be implemented as a central clearing mechanism using two independent double-auction markets of, for example, five or ten minutes (ON-to-OFF and OFF-to-ON).

Additional Examples of the Disclosed Technology

In another embodiment, each grid-connected appliance can be assigned a frequency threshold based on a fitness metric. The fitness metric can be based on a particular appliance's ability to provide a frequency response (e.g., turning off in an under-frequency event or turning on in an over-frequency event). Then, each grid-connected appliance can be ordered or assigned a priority based on their assigned fitness metrics and frequency thresholds can be assigned based on this ordering. That is, appliances that can most readily provide a particular frequency response can be assigned frequency thresholds closest to a target frequency value and appliances that are less readily able to provide a frequency response can be assigned frequency thresholds further from the target frequency. Thus, if an over-frequency or under-frequency event occurs, the appliances that can most readily provide an appropriate frequency response will do so before other appliances that cannot as readily provide a frequency response. As such, the overall performance of the power grid can be improved.

Figure 11:
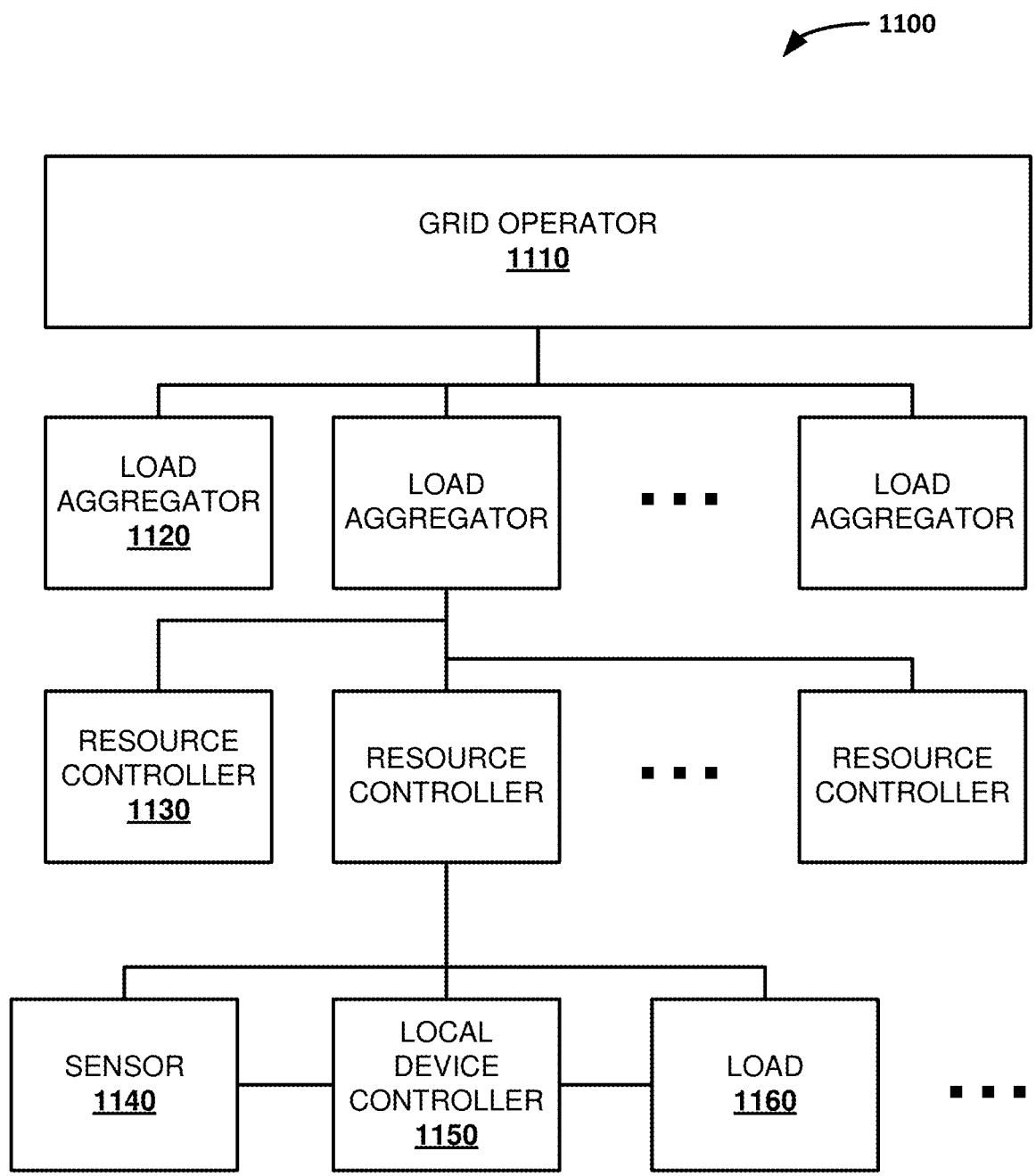
FIG. 11 is a block diagram of an example system for assigning frequency thresholds to grid-connected devices.

FIG. 11 shows a block diagram of a hierarchical system 1100 for implementing a power grid in which frequency thresholds are assigned based on fitness metrics, in accordance with disclosed technology as described herein. The system 1100 comprises a grid operator 1110, a plurality of load aggregators 1120, a plurality of resource controllers 1130, and a plurality of sensors 1140, local device controllers 1150, and loads 1160. The grid operator 1110 can provide power to the system and communicates with the plurality of load aggregators 1120 as disclosed herein. Each load aggregator 1120 can communicate with the grid operator 1110 and with a plurality of resource controllers 1130 as disclosed herein. In the illustrated example, each load aggregator 1120 can communicate with a number of resource controllers 1130 within one distribution sphere (about 1,000 houses). In other examples, each load aggregator 1120 can communicate with any number of resource controllers 1130. Each resource controller 1130 can communicate with a local device controller 1150, a load 1160 (e.g., a grid-connected appliance), and one or more sensors 1140 as disclosed herein. Each local device controller 1150 can receive sensor data and can control one load 1160.

Each load 1160 can be a grid-connected electrical appliance such as an air conditioner or a water heater. Each load 1160 can be controlled by a local device controller 1150 using known techniques. Each local device controller 1150 can receive measurement data from one or more sensors 1140 (e.g., temperature readings) to control the load 1160. In an example where the load is an air conditioner, a user can set a temperature setpoint. The local device controller 1150 can then read temperature data from the sensors 1140 and turn the load 1160 on when the measured temperature rises above the setpoint and turn the load off when the measured temperature falls below the setpoint. In addition, the local device controller 1150 can follow supervisory control from the resource controller 1130. The local device controller 1150 can transmit information to the resource controller 1130 including whether the load 1160 is in an on or off state at a particular time.

Figure 12:
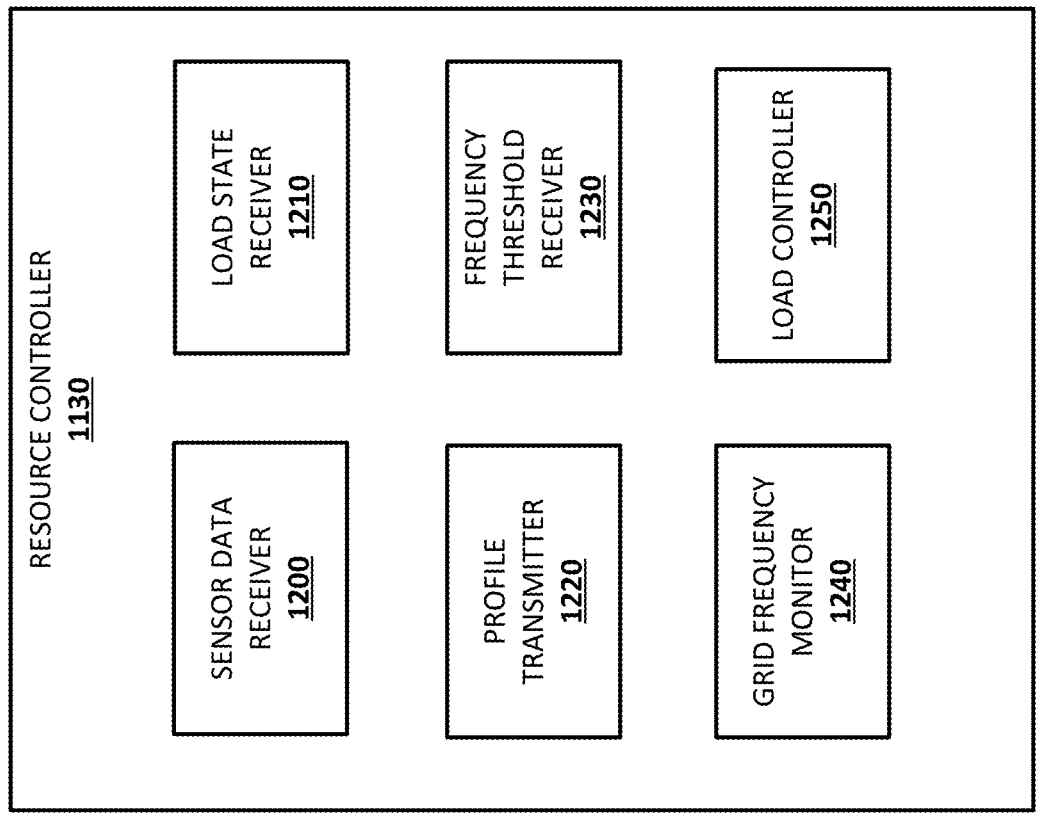
FIG. 12 is a block diagram of an example resource controller of FIG. 11.

FIG. 12 shows a block diagram of an example resource controller 1130. In the illustrated example, the resource controller 1130 can comprise sensor data receiver 1200, a load state receiver 1210, a profile transmitter 1220, a frequency threshold receiver 1230, a grid frequency monitor 1240, and a load controller 1250. As explained above, each resource controller 1130 can receive data from one or more sensors 1140 associated with a particular load 1160 and can communicate with the local device controller 1150 associated with the load to control the operation of the load. In the illustrated example of FIG. 12, the sensor data receiver 1200 can receive data from the sensor 1140. In the illustrated example, the load state receiver 1210 can receive information from the local device controller 1150 as to the operational state of the load 1160 at a particular time (e.g., whether the load is on or off). In some examples, the load state receiver 1210 can receive load state information directly from the load 1160 rather than from the local device controller 1150. In the illustrated example, profile transmitter 1220 can transmit the data received by the sensor data receiver 1200 and the load state receiver 1210 to the load aggregator 1120 associated with the resource controller 1130. This data constitutes a use profile (sometimes referred to herein as a load profile) of the load 1160 that the load aggregator 1120 can use to determine a fitness metric and assign a frequency threshold for the load 1160, as discussed in further detail below. The frequency threshold receiver 1230 can receive a frequency threshold for the load 1150 from the load aggregator 1120. The grid frequency monitor 1240 can monitor the grid frequency and determine if the grid frequency is above or below the frequency threshold received from the load aggregator 1120. The load controller 1250 can communicate with the local device controller 1150 to control the operation of the load 1160. Specifically, the load controller 1250 can send a signal to the local device controller 1150 to cause the load 1160 to turn off or deactivate if the detected grid frequency is below the assigned frequency threshold (in an under-frequency response) or the load controller 1250 can send a signal to the local device controller 1150 to cause the load 1160 to turn on if the detected grid frequency is above the assigned frequency threshold (in an over-frequency response).

Figure 13:
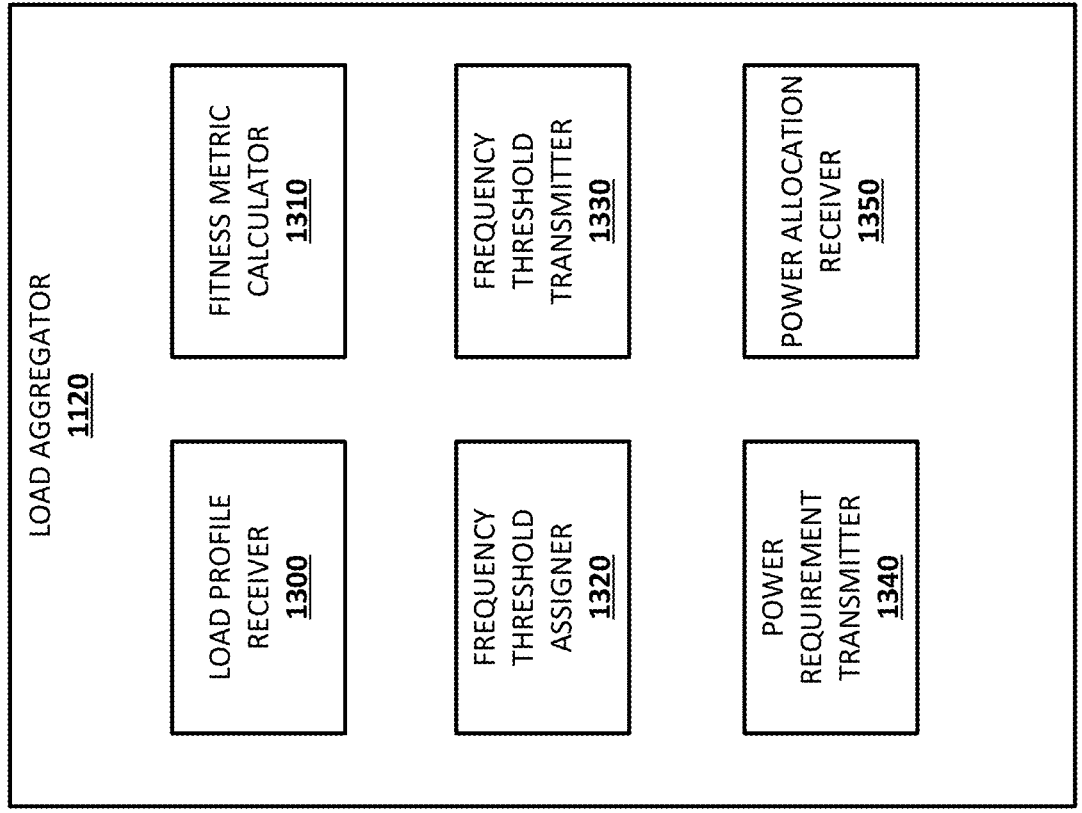
FIG. 13 is a block diagram of an example load aggregator of FIG. 11.

FIG. 13 shows a block diagram of an example load aggregator 1120. The load aggregator 1120 is responsible for aggregating the data regarding the operation of each load 1160 within its purview (e.g., within one distribution sphere) and assigning an appropriate frequency threshold for each such load. In the illustrated example, the load aggregator 1120 can comprise a load profile receiver 1300, a fitness metric calculator 1310, a frequency threshold assigner 1320, a frequency threshold transmitter 1330, a power requirement transmitter 1340, and a power allocation receiver 1350. In the illustrated example, the load profile receiver 1300 receives data from each resource controller 1130 that the load aggregator 1120 is responsible for. This can include all or any subset of the data received by the resource controller 1130 from one or more sensors 1140, a local device controller 1150, and the associated load 1160. The fitness metric calculator 1310 calculates a fitness metric for a resource controller 1130 and an associated load 1160 using the methods disclosed herein. The frequency threshold assigner 1320 assigns a frequency threshold for a resource controller 1130 based on the calculated fitness metric. The frequency threshold transmitter 1330 transmits the assigned frequency to the appropriate resource controller 1130. The power requirement transmitter 1340 determines the total power required to operate each of the loads 1160 associated with the load aggregator 1120 based on the data received by the load profile receiver 1300 and transmits this power requirement to the grid operator 1110. The power allocation receiver 1350 receives from the grid operator 1110 an allocated power value that the load aggregator 1120 can operate at.

In the illustrated example, the grid operator 1110 can analyze the available flexibility across the network, along with the current network status (e.g., generation and load forecast, measurements from power management units, topology, etc.) to optimally allocate control capacities from the responsive load ensembles. The grid operator 1110 then transmits an allocated capacity to each of the load aggregators 1120.

Figure 14:
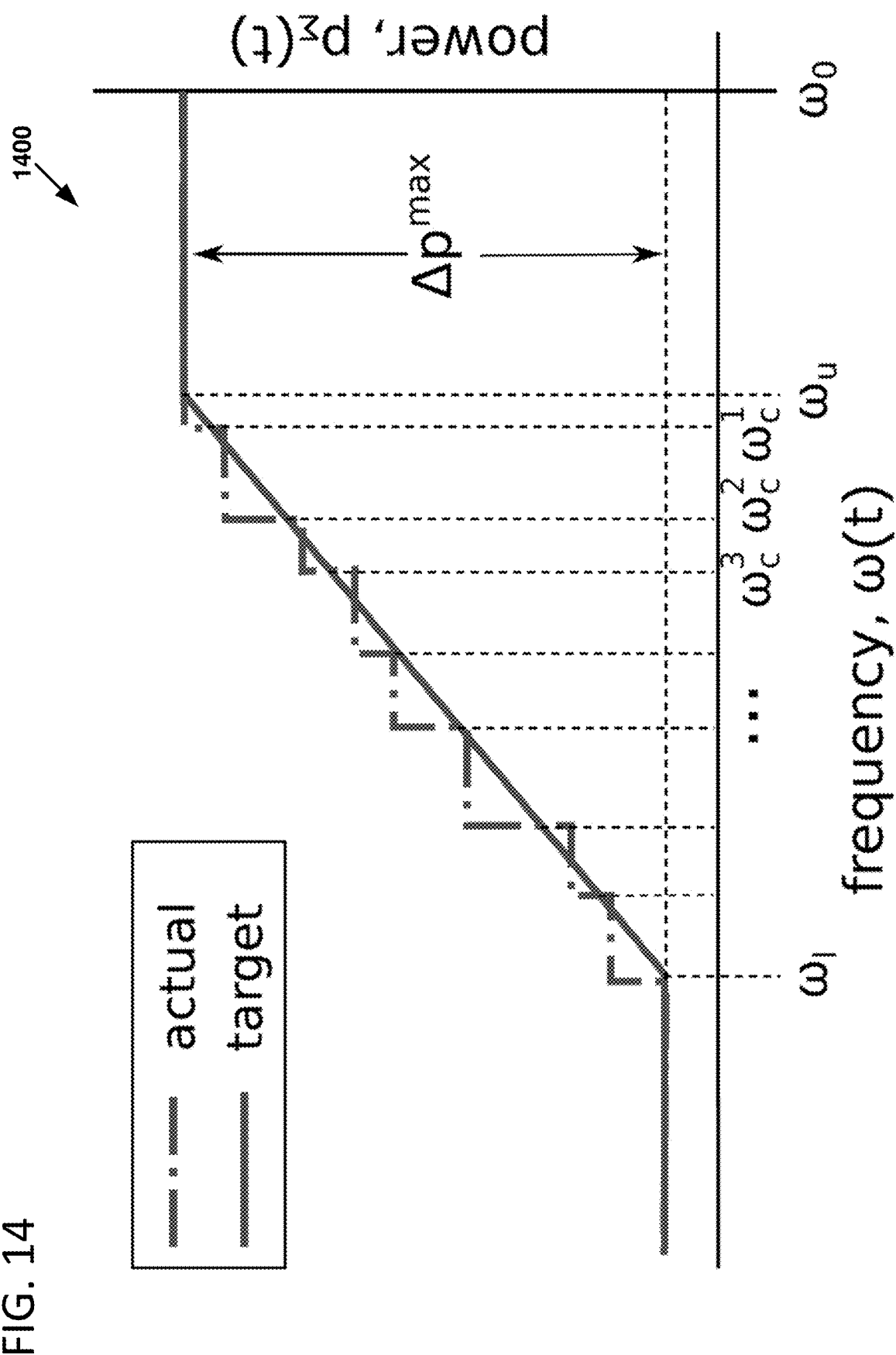
FIG. 14 illustrates an example power-frequency response curve.

FIG. 14 shows a frequency response profile 1400 for a power grid system such as system 1100. As the grid frequency drops from a target value, the power consumption should drop linearly as shown in the solid line. However, in an actual system, the response will more closely resemble the dashed line. In the example of FIG. 14, each grid-connected device is assigned a frequency threshold and each device shuts off when the grid frequency drops below its assigned frequency threshold. This can be seen in the dashed line of FIG. 14 where power consumption drops each time a device shuts off at grid frequencies of $\omega_c^1$, $\omega_c^2$, $\omega_c^3$, etc. However, not all devices are able to readily shut off in response to the grid frequency hitting the device's assigned frequency threshold. For example, if the device is not in an on state when the frequency threshold is hit, the device cannot turn off. Furthermore, different devices may have different time delays in responding to a frequency threshold being reached. Accordingly, assigning frequency thresholds to grid-connected devices based on each device's ability to respond to a frequency request, using the disclosed technology, can help the actual frequency response curve to more closely resemble the target response curve of FIG. 14, thereby improving system performance.

In order to assign appropriate frequency thresholds to each grid-connected load 1160, each load aggregator 1120 can determine the ability of each load 1160 to respond to a frequency request (e.g., turn off in an over-frequency event or turn on in an under-frequency event). One approach to accomplish this task would be for the load aggregators 1120 to continuously monitor the operating state of each device 1160. Although this approach can help achieve this goal, such continuous monitoring can have high telemetry requirements and can have potential privacy concerns for the device owners. Instead, a more viable option is to periodically acquire and update the state of each device at the start of fixed control time windows. This information can then be used to estimate the availability of the device to respond to a frequency event during the control window.

In the illustrated example, the load aggregators 1120 can determine a fitness metric for each load or device 1160. This fitness metric is a measure of the device's ability to response to a frequency event (e.g., turn off in an under-frequency event or turn on in an over-frequency event). The devices 1160 can then be ordered based on their fitness metrics and assigned frequency thresholds based on the fitness metrics (e.g., the higher fitness metric a device has, the closer its frequency threshold will be to the target grid frequency). The fitness metric for a load 1160 can be determined based on information received by the resource controller 1130 associated with the device, as discussed above, as well as based on previous performance of a particular device 1160 in response to a frequency request. The determination of fitness metrics is discussed in further detail below.

As disclosed herein, fitness is a qualitative measure of the ability of a controllable load to successfully respond to a certain ancillary service request (e.g., a frequency response). Specifically, the fitness of a device i to respond to a request k can be denoted by a scalar $\pi_k^i$ which can have a value between 0 and 1 and quantifies how likely the device i is to successfully complete the request k over some time window. This metric of fitness can depend on a variety of factors such as device dynamics, response delays, rate of failure to respond to the request, and the type of service request. In a simplified form, the fitness can be composed of two component metrics, availability for response and quality of response.

The availability metric of a device i for response to a service request k can be denoted by $\pi_k^{avail,i}$. This metric can have a value between 0 and 1 and can represent the probability that the device is available to respond to the particular service request over some time (e.g., the probability that the device is on or active when a request is made to turn the device off). The quality metric of a device i for response to service request k can be denoted by $\pi_k^{qual,i}$. This metric can have a value between 0 and 1 and can represent the probability that the device, when available, completes the service request successfully. The overall fitness metric can be a product of the availability metric and the quality metric as follows: $\pi_k^i = \pi_k^{avail,i} \cdot \pi_k^{qual,i}$.

The quality metric can depend on a variety of different factors including sensor and actuation time-delays, as well as sensor and actuators failures. In a simplified form, the performance degradation due to time-delays can be modeled into the quality metric as $\pi_k^{qual,i} = \exp(-\beta_{d,k} t_{d,k}^i)$, where $\beta$ is an appropriate scaling factor and $t_{d,k}^i$ is an estimated time-delay of the device in responding to the particular service request. In some examples, the estimated time-delay can be based on the time delay in responding to previous such requests. A total failure of the device to respond to the request would be captured by the limiting case $t_{d,k}^i \to +\infty$ while $t_{d,k}^i = 0$ would refer to a success rate of 1. In some examples, the quality metric is assumed equal to 1 for all devices. In other examples, the quality metric of a device for a particular service is estimated by monitoring the performance of the device in response to similar requests over time.

The availability metric for a device can be determined based on how likely a device is to be available for a particular service. In the illustrated example, the availability metric of a device is the probability that the device is able to respond to a frequency request. That is, for an under-frequency event, the availability metric is equal probability that the device is turned on when the event happens, and thus is available to be turned off.

For an over-frequency response, the availability metric is equal to the probability that the device is turned off when the event happens, and thus is available to be turned on. Assuming that the probability of an under-frequency event happening at any time t is uniformly distributed within an interval $[t_0, t_f]$, the availability metric of device for under-frequency response (denoted by the subscript "resp−") can be obtained as:

$$\pi_{resp-}^{avail,i} = Pr\{\text{device-}i \text{ is 'on' when under-frequency happens}\} \quad (9)$$

$$= \int_{t_0}^{t_F} Pr\{\text{device-}i \text{ is 'on' at time } \tau\} \cdot f_{resp-}(\tau) d\tau$$

$$= \int_{t_0}^{t_f} \frac{s^i(\tau)}{t_f - t_0} d\tau = \frac{t_{on}^i}{t_f - t_0}$$

where, $s^i(\cdot) \in \{0, 1\}$ represents the operational state of the device, taking value 0 in the "off" state and 1 in the "on" state; $t_{on}^i$ is the length of time the device spends in the "on" state during the control window $[t_0, t_f]$; and $f_{resp-}(\cdot)$ is the uniform probability density function at the time of occurrence of the under-frequency event. With the knowledge of the internal states of each the devices 1150, and some forecast of the external conditions based on sensor data, it is possible to estimate $\pi_{resp-}^{avail,i}$ for each device at the start of each control period. Using similar arguments, the availability factor for an over-frequency response (denoted by the subscript "resp+") over an control window $[t_0, t_f]$ could be calculated as:

$$\pi_{resp+}^{avail,i} = \frac{t_{off}^i}{t_f - t_0} \quad (10)$$

where $t_{off}^i$ is the length of time the device spends in the "off" state during the control window $[t_0, t_f]$. Discussed below are some examples of how these availability factors can be computed based on information on the current states, device parameters, and forecasts of end-usage and external conditions.

In one example, the devices 1150 can be an ensemble of N air-conditioning (AC) loads. Each device dynamics can be represented by, $$\dot{T}(t) = -\frac{(T(t) - T_a(t))}{CR} - \frac{\eta p(t)}{C}, \quad (11a)$$

$$p(t^+) = \begin{cases} 0, & \text{if } T(t) \leq T_{set} - \delta T/2 \\ P, & \text{if } T(t) \geq T_{set} + \delta T/2, \\ p(t), & \text{otherwise} \end{cases} \quad (11b)$$

where $T(t)$ is the room temperature; $p(t) \in \{0,P\}$ represent the power draw of the AC; $T_a(t)$ denotes the outside air temperature; and C, R, η are the device parameters representing the room thermal resistance, thermal capacitance and the load efficiency, respectively. $T_{set}$ is the temperature set-point and $\delta T$ represents the width of the temperature hysteresis deadband. Let us assume that, at the start of an control window $[t_0, t_f]$, the room temperature $T(t_0)$ and the operational state of the AC (in the form of power consumed $p(t_0)$ are known to the resource controller. If the outside air temperature is constant throughout the control window, the dynamics can be solved to compute the time $t_{on}^{off}$ an initially "on" device spends before turning "off," and the time $t_{off}^{on}$ an initially "off" device spends before turning "on" as:

$$t_{on}^{off} = CR\log\left[\frac{(T(t_0) - T_a(t)) + \eta PR}{(T_{set} - \delta T/2 - T_a(t)) + \eta PR}\right], \quad (12a)$$

$$t_{off}^{on} = CR\log\left[\frac{T(t_0) - T_a(t)}{T_{set} + \delta T/2 - T_a(t)}\right]. \quad (12b)$$

The time a device spends in the 'on' and off state during the control window is given by:

$$t_{on} = \begin{cases} \min(t_f - t_0, t_{on}^{off}), & \text{'on' at } t_0 \\ \max(0, t_f - t_0 - t_{off}^{on}), & \text{'off' at } t_0 \end{cases} \quad (13a)$$

$$t_{off} = t_f - t_0 - t_{on}. \quad (13b)$$

In another example, the devices 1160 can be an ensemble of N electric water-heating (EWH) loads. The water temperature dynamics of an EWH can be modeled using a "one-mass" thermal model which assumes that the temperature inside the water-tank is spatially uniform (valid when the tank is nearly full or nearly empty):

$$\dot{T}_w(t) = -a(t)T_w(t) + b(s(t), t), \quad (14)$$

where, $a(t) := \frac{1}{C_w}(\dot{m}(t)C_p + W)$, $\& \, b(s(t), t) := \frac{1}{C_w}(s(t)P + \dot{m}(t)C_p T_{in}(t) + WT_a(t))$.

$T_w$ denotes the temperature of the water in the tank, and s(t) denotes a switching variable which determines whether the EWH is drawing power (s(t)=1 or "on") or not (s(t)=0 or "off"). The state of the EWH ("on" or "off") is determined by the switching condition:

$$s(t^+) = \begin{cases} 0, & \text{if } T_w(t) \geq T_{set} + \delta T/2 \\ 1, & \text{if } T_w(t) \leq T_{set} - \delta T/2, \\ s(t), & \text{otherwise} \end{cases} \quad (15)$$

where $T_{set}$ is the temperature set-point of the EWH with a deadband width of $\delta T$. Let us assume that, at the start of an control window $[t_0, t_f]$, the room temperature, $T_w(t_0)$, and the operational state of the EWH, $s(t_0)$, are known to the resource controller. If the exogenous parameters are unchanged throughout the control window, then the dynamics can be solved to compute the time $t_{on}^{off}$ an initially "on" device spends before turning "off," and the time $t_{off}^{on}$ an initially "off" device spends before turning "on" as:

$$t_{on}^{off} = \frac{1}{a(t)}\log\left[\frac{-a(t)T_w(t_0) + b(1, t)}{-a(t)(T_{set} + \delta T/2) + b(1, t)}\right], \quad (16a)$$

$$t_{off}^{on} = \frac{1}{a(t)}\log\left[\frac{-a(t)T_w(t_0) + b(0, t)}{-a(t)(T_{set} - \delta T/2) + b(0, t)}\right]. \quad (16b)$$

The time the device spends in the "on" and "off" state during the control window as:

$$t_{on} = \begin{cases} \min(t_f - t_0, t_{on}^{off}), & \text{'on' at } t_0 \\ \max(0, t_f - t_0 - t_{off}^{on}), & \text{'off' at } t_0 \end{cases} \quad (17a)$$

$$t_{off} = t_f - t_0 - t_{on}. \quad (17b)$$

Using the above discussed techniques, at the start of the control window ($t=t_0$), the fitness values of each device 1150 in the population are computed for any particular service k (e.g., a frequency response). Based on the computed fitness values, $\pi_k^i \forall_i \in \{1, 2, \ldots, N\}$, all the devices 1150 are prioritized in an order $\{d_1, d_2, d_3, \ldots, d_N\}$ for consideration of commitment to service k, such that $$\pi_k^{d_1} \geq \pi_k^{d_2} \geq \pi_k^{d_3} \ldots \geq \pi_k^{d_N}. \quad (18)$$

Then, using this ordering, frequency thresholds (for primary frequency response) are assigned, such that devices with frequency thresholds closer to the nominal frequency are assigned to higher priority (e.g., 'fitter') devices. After assigning the frequency thresholds, a subset of the devices 1160 can be selected, based on the priority order, such that their aggregate power rating equals (within some tolerable error, $\epsilon_p$) the target response capacity $\Delta p^{max}$, e.g. choose the smallest $m \in \{1, 2, \ldots, N\}$ such that:

$$\left|\Delta p^{max} - \sum_{i=1}^{m} P^{d_i}\right| \leq \epsilon_p. \quad (19)$$

Furthermore, the probability that all the devices responding to the service request is given by, $$Pr\{\text{'success'}\} = \prod_{i=1}^{m} \pi_k^{d_i}, \quad (20)$$

Consequently, we can also compute the maximal response capacity that the aggregation of devices can commit to with a probability of success 1, which is defined as follows. The maximal capacity that an aggregation can successfully (e.g. with probability=1) commit for any service-k is denoted by $[\Delta_p]_k^{cap}$ and is given by $$[\Delta p]_k^{cap} := P^{d_1} + P^{d_2} P^{d_n}, \quad (22)$$

such that $\pi\_k(d\_i) = 1 \forall i \in \{1, 2, \ldots, n\}$ and $\pi\_k(d\_(n+1)) < 1$ Control performance can be evaluated against a metric termed as the reserve margin variability target (RMVT) which is expressed as the following, $$RMVT := \left|1 - \frac{\text{total response provided on request}}{\text{total response requested}}\right|.$$

There are several sources of uncertainties that may affect the control performance (and contribute to the RMVT), such as forecast errors, modeling uncertainties and faults in sensors. Of particular interest to this work are the uncertainties due to control parameters, such as the discrete allocation of frequency thresholds and sampling time delays.

As can be seen from FIG. 14, due to the discrete power consumption of the devices and due to finite number of devices committing to provide the frequency response, at any frequency value, the maximal deviation is given by the power rating of the largest device that has committed to the service. Using the threshold assignment logic disclosed above, the relative error in response (relative to the response capacity) due to discrete loads can be given by, $$\frac{\delta p}{\Delta p^{max}} \leq \frac{\max_{i=1,\ldots,m} P^{d_i}}{\sum_{i=1}^{m} P^{d_i}} \quad (23)$$

This suggests that in order for the relative error in response to be less than certain pre-specified performance metric $\in$, the committed aggregate capacity for response has to be larger than certain critical value, e.g.

$$RMVT \leq \epsilon \Rightarrow \Delta p^{max} \geq \frac{\max_i P^i}{\epsilon} \quad (24)$$

Figure 15:
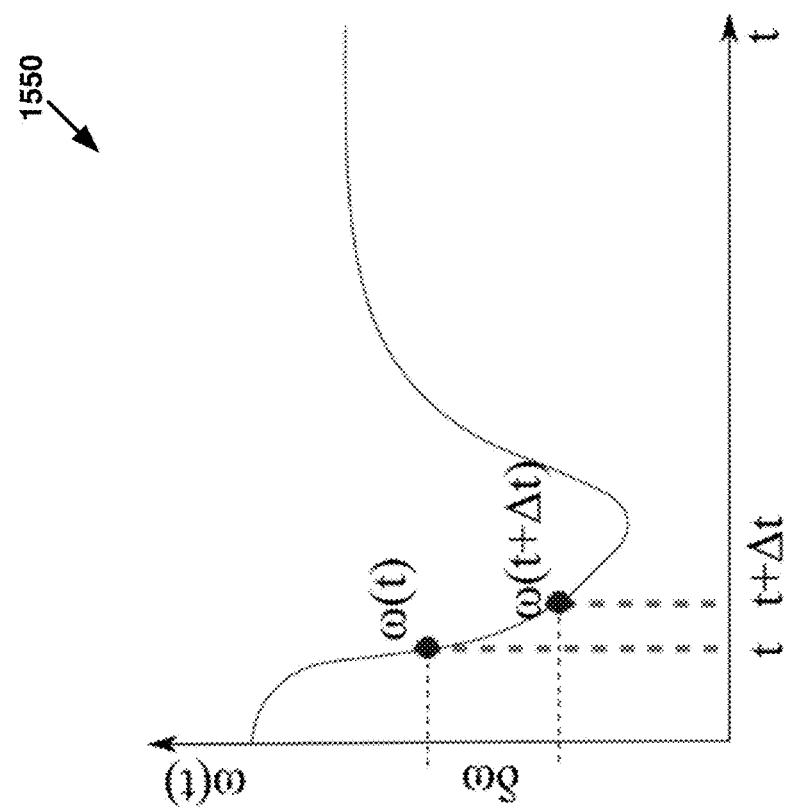
FIG. 15 illustrates an example error curve due to finite non-zero sampling time.
Figure 15:
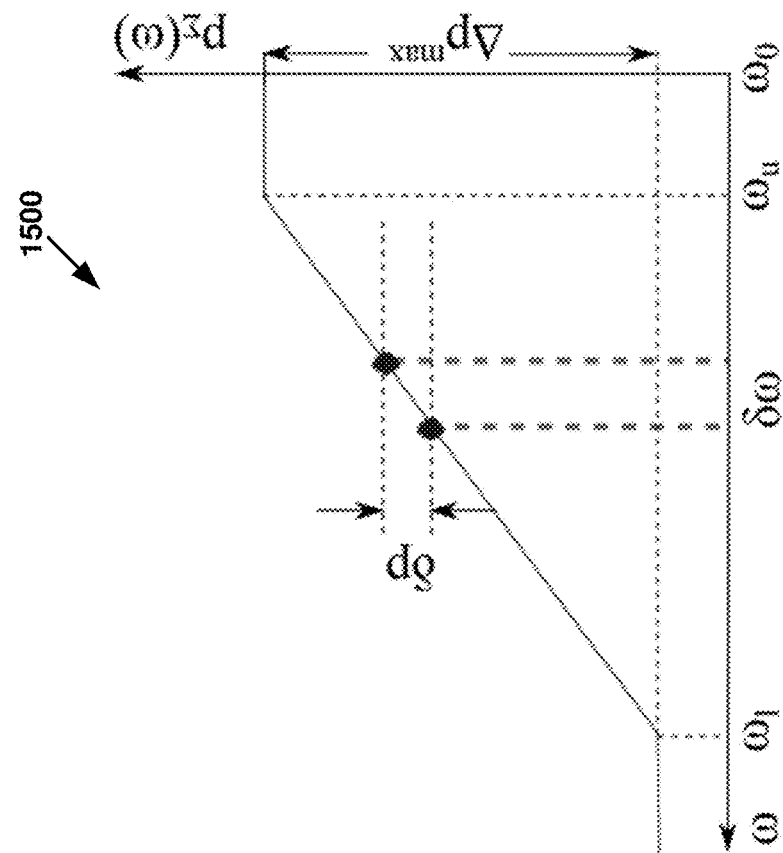

In general, the delay between a sensor measurement or service request and the control execution (or, actuation) can have multiple components, e.g. actuator delays ($t_d$), and delays due to finite sampling rate ($\Delta t$). The effective delay in response, therefore will be given by max ($t_d, \Delta t$). For simplicity, in the examples disclosed herein, the actuator delay is assumed to be negligible ($t_d$=0), in order to consider only on the delay due to finite sampling rate. FIG. 15 shows a first chart 1500 showing the change in response capacity $\delta p$ as a function of frequency and a second chart 1550 showing the change in frequency $\omega(t)$ over time t. The local sensor of a device can detect that frequency $\omega(t)$ at time t is lower than its assigned frequency threshold and therefore, according to the control logic above, turns "off" at the next time instant t+$\Delta t$, where $\Delta t$ refers to the non-zero discrete sampling time. If the frequency deviates further during this time delay, there is a non-zero deviation, $\delta p$, from the target frequency response curve. For small $\Delta t$, this error can be estimated as, $$\delta p \approx \frac{\partial p_\Sigma(\omega)}{\partial \omega}\bigg|_{\omega(t)} \cdot \frac{\partial \omega}{\partial t}\bigg|_t \cdot \Delta t \quad (25a)$$

$$\Rightarrow \frac{\delta p}{\Delta p^{max}} \approx \frac{\Delta t}{(\omega_u - \omega_t)} \frac{\partial \omega}{\partial t}\bigg|_t \quad (25b)$$

e.g. the relative error in response due to finite sampling rate is proportional to the sampling time, as well as the rate of change of frequency.

Simulation Results

In order to test the prioritized decentralized frequency response algorithm, a random collection of 1000 ACs and 1000 EWHs was generated. The limits for the frequency response were chosen as:

59.7 Hz and 59.995 Hz for under-frequency response, and
60.005 Hz and 60.3 Hz for over-frequency response.

Figure 16:
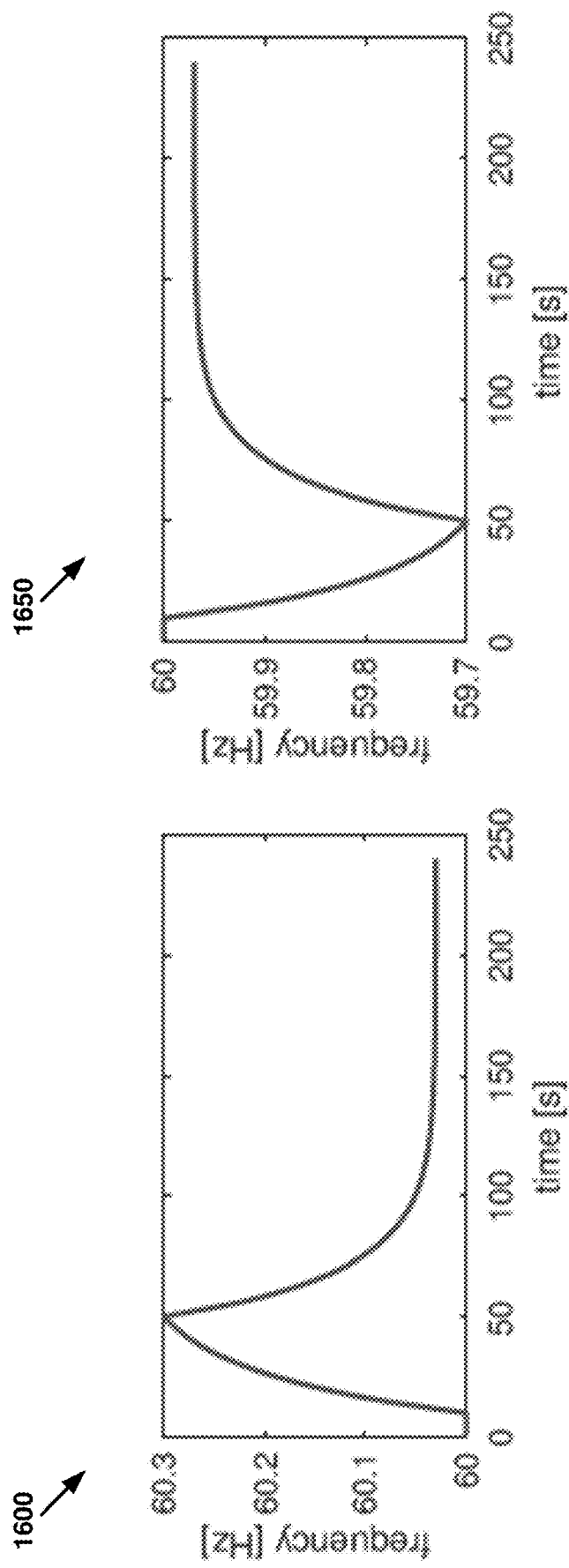
FIG. 16 shows sample under-frequency and over-frequency events.

Several frequency events were created in an IEEE 39-bus network, by injecting disruptions via changing the loads. FIG. 16 illustrates two such events, an over-frequency response 1600 and an under-frequency response 1650. Performance of the frequency response control algorithm was tested against these various frequency events (shifted in time as appropriate).

Figure 17A:
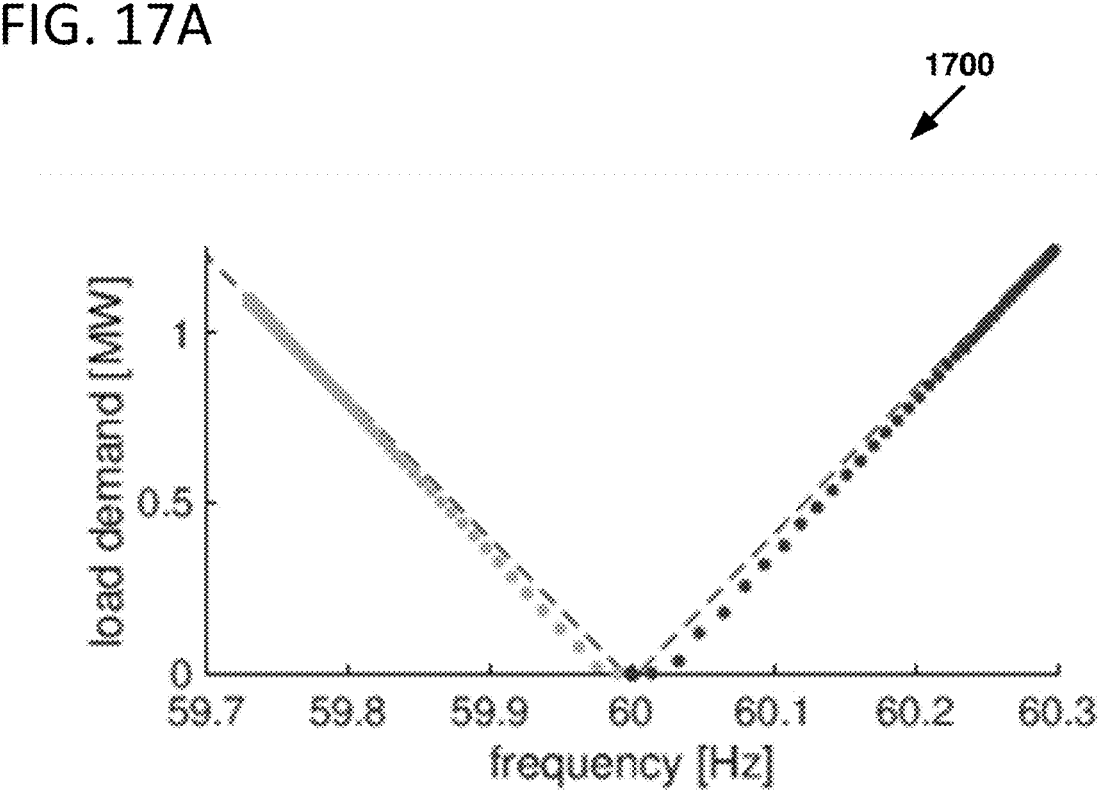
FIGS. 17A-17B illustrate example target and achieved frequency response curves.
Figure 17B:
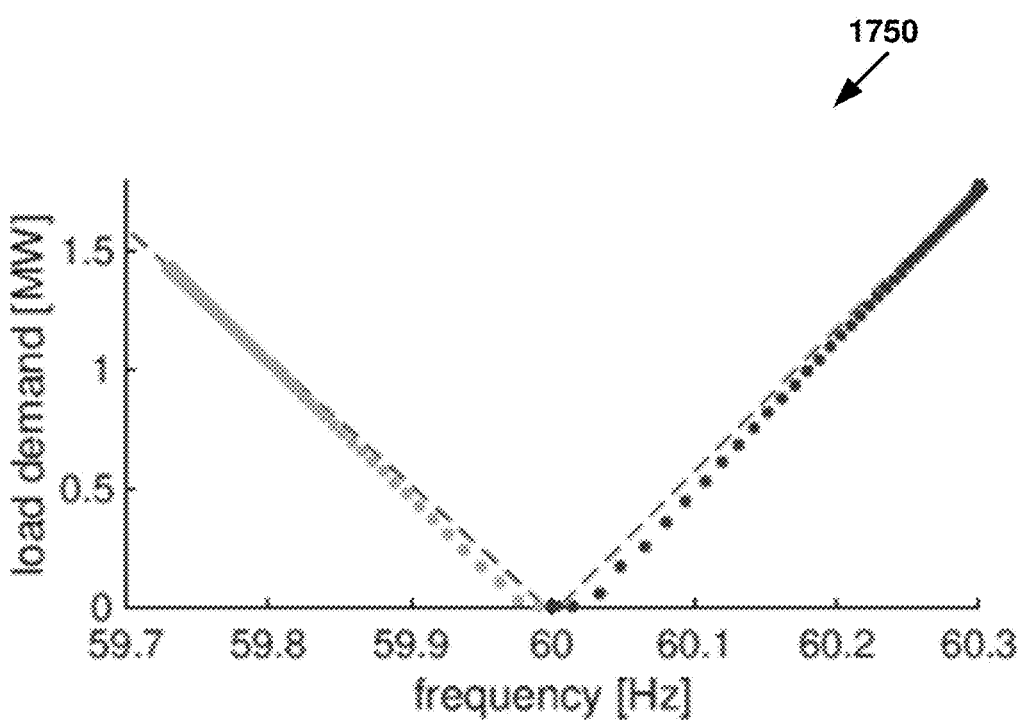

FIGS. 17A and 17B illustrate how the target and achieved frequency response curves typically look like, simulated using 1000 EWHs in chart 1700 and 1000 ACs in chart 1750. The results are obtained for a 5 mm control window, with a sampling time of $\Delta t$=1 s, while the response capacity is set at 60% of the maximal capacity as defined above. It is noted that, with either type of the devices, the achieved response is fairly close to the target response, with some errors being observed for lower frequency deviations. This key observation can be explained by looking at the frequency events in FIG. 16. The rate at which the frequency changes is high when the frequency deviation is low (e.g. closer to the nominal value of 60 Hz) and gradually decreases (due to damping effect by the generators) as the frequency deviates further. This suggests that the sampling time should be chosen sufficiently small for faster frequency events.

Figure 18A:
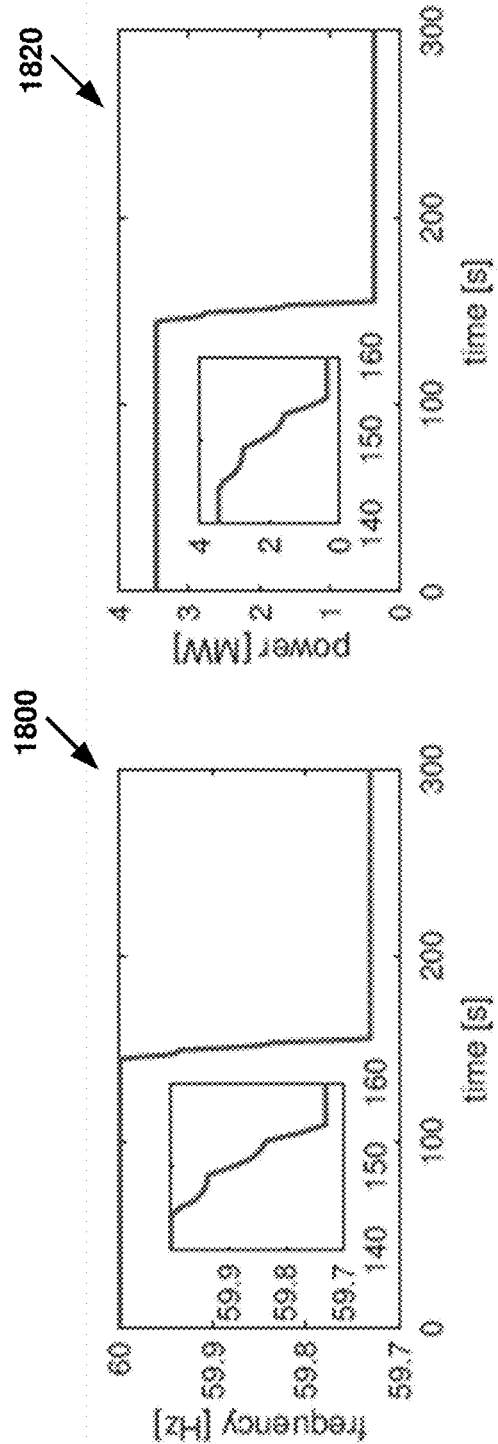
FIGS. 18A-18B illustrate example performance under a cascading contingency.
Figure 18B:
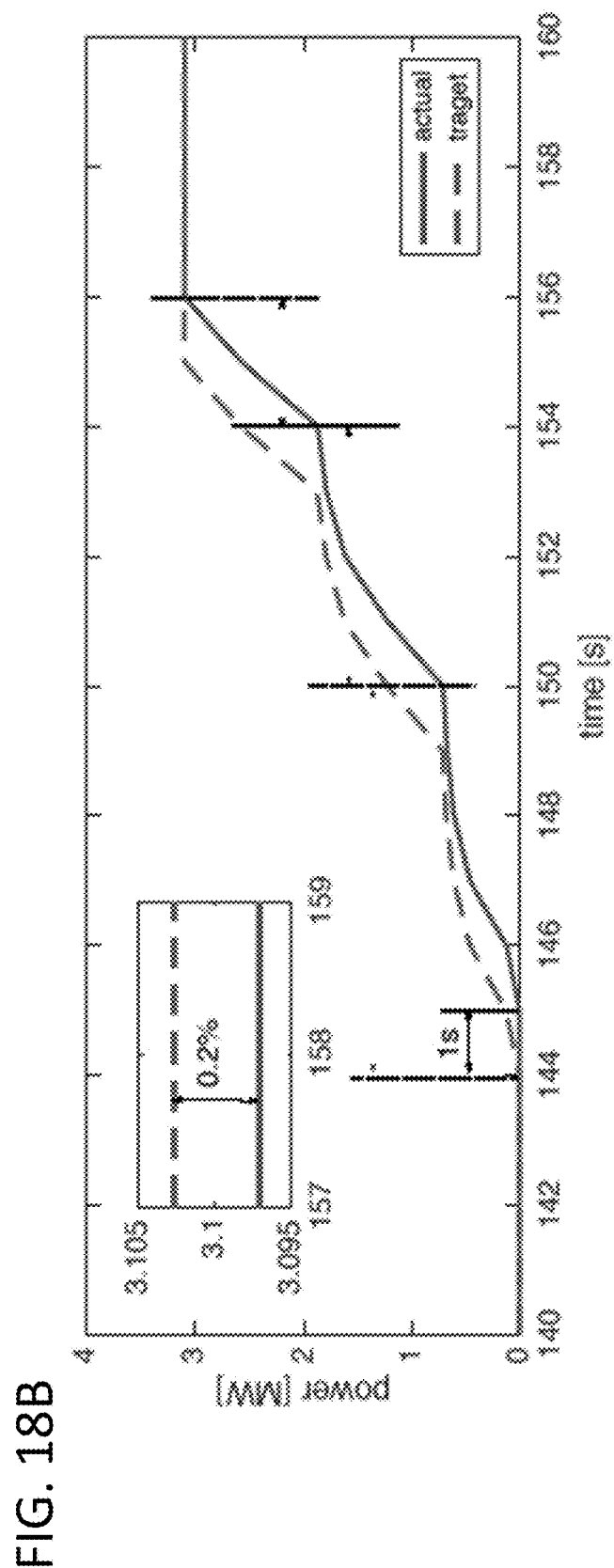

FIG. 18A shows the response of the group of 1000 ACs (chart 1800) and 1000 EWHs (chart 1820) in response to a cascading contingency where an initial contingency (created by load drop) leads to two subsequent under-frequency events. In the example of FIGS. 18A and 18B, control was chosen as 5 mm. The net response magnitude achieved is 3.097 MW, which is less than 0.2% of the target 3.103 MW, e.g. RMVT<0.2%. It is noted that, the achieved response is able to track the target response curve always within 1 s delay.

Figure 19:
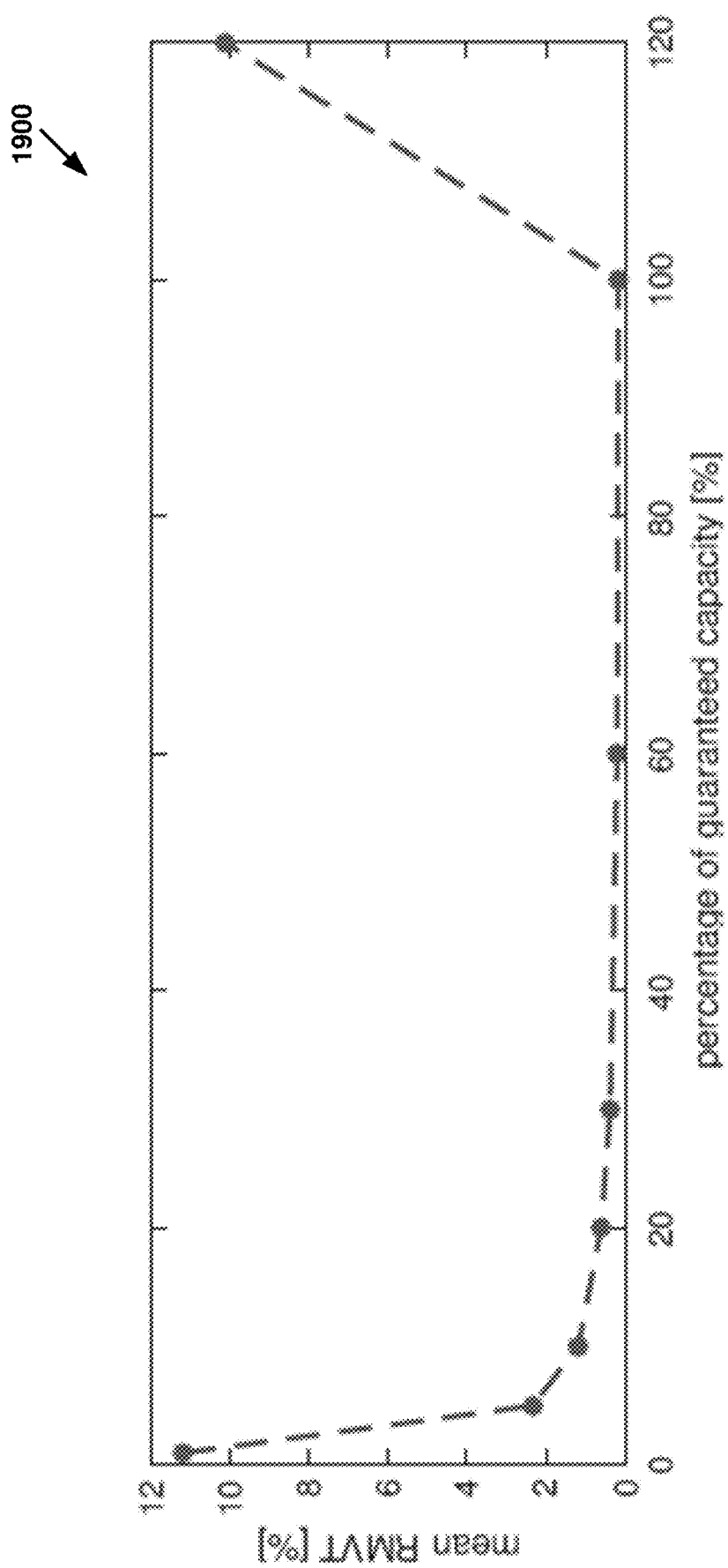
FIG. 19 illustrates error statistics at varied commitment level as a percentage of the maximal guaranteed capacity.

Discrete allocation of frequency thresholds introduce certain error in the response curve. FIG. 19 is a chart 1900 that shows the error statistics (in the form of mean RMVT) as the committed capacity is varied between 1% and 120% of the maximal guaranteed capacity, e.g. the ratio of $\Delta p^{max}/[\Delta p]_k^{cap}$ is plotted on the x-axis. Clearly below 20% commitment (~1 MW), the error is high due to discrete allocation of resources, which steadies to <0.3% (coming from sampling time) from over 20% up to 100%. Beyond 100% commitment, the error increases again due to unavailability of sufficient number of "fit" devices.

Figure 20:
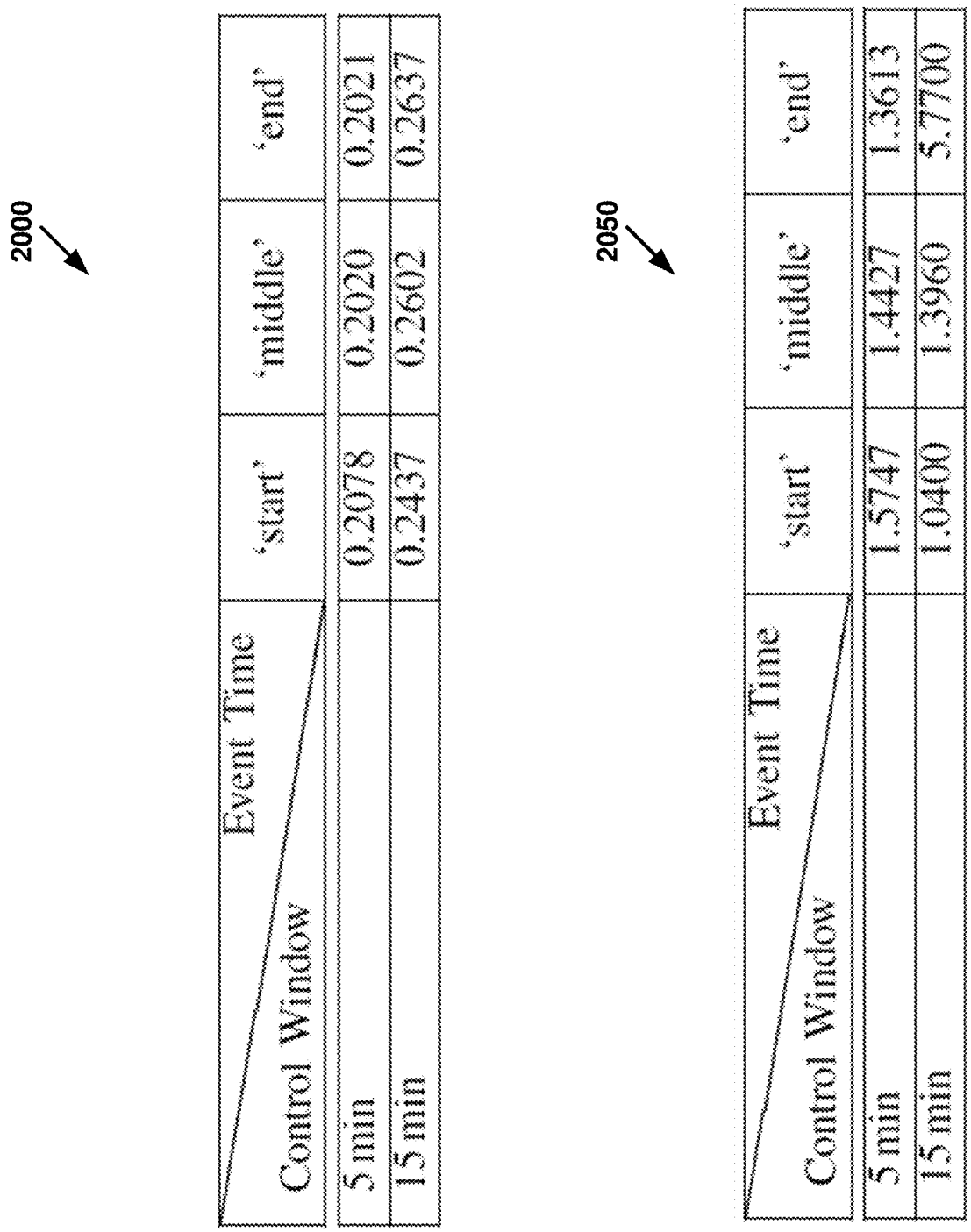
FIG. 20 illustrates performance results for simulated examples.

Finally Monte-Carlo simulations were run to test the algorithm under various different scenarios. With a fixed (but randomly generated) population of 1000 EWHs and 1000 ACs, different scenarios were created by changing the initial operating condition, the length of the control window as well as the time when the frequency event happens. The RMT level was chosen to be 60% of the estimated maximal guaranteed capacity. In Table 2000 of FIG. 20, the mean RMVT values for 6 different scenarios are presented. Across all these scenarios, the priority-based algorithm performs uniformly well with mean RMVT<0.3%. However, when not using the priority-based algorithm, as shown in Table 2050 of FIG. 20, the RMVT increases and is sensitive to the length of the control window and when the time of occurrence of the event.

Figure 21:
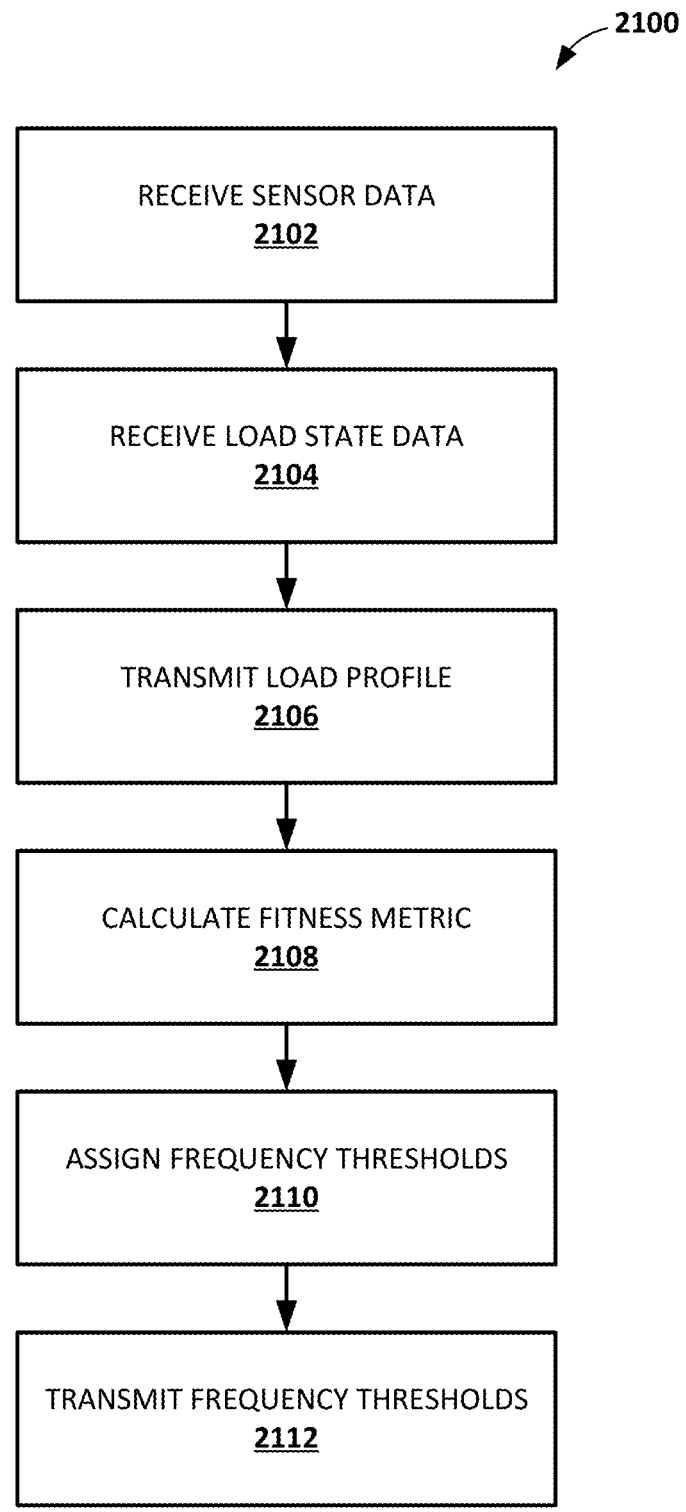
FIG. 21 is a flowchart depicting an example method of assigning frequency thresholds as can be performed in certain examples of the disclosed technology.

FIG. 21 is a flowchart 2100 depicting an example method of assigning frequency thresholds to grid-connected appliances. For example, the hardware discussed above regarding FIGS. 11 and 12 can be used to implement the illustrated method.

At process block 2102, the sensor data receiver 1200 of a resource controller 1130 receives data from the sensor 1140 associated with the resource controller. In the illustrated example, the received sensor data is a temperature of the environment of the load 1160. In other examples, the sensor 1140 can provide other types of data regarding the environment or operation of the load 1160.

At process block 2104, the load state receiver 1210 of the resource controller 1130 receives from the local device controller 1150 associated with the load 1160 the current state of the load. In the illustrated example, the current state of the load can be either on or off. In some examples, the resource controller 1130 can receive time series power consumption data from the local device controller 1150 associated with the load 1160. In other examples, the load state receiver 1210 can receive other information regarding the state of the load 1160. In the illustrated example, each resource controller 1130 of the system 1100 receives sensor data and load state data at the beginning of each control time window. In other examples, this data can be received at other intervals.

At process block 2106, the profile transmitter 1220 transmits the data received by the sensor data receiver 1200 to the load aggregator 1120. This data represents a profile of the load 1160 that the load aggregator 1120 can use to determine a fitness metric. After this data is sent, the load profile receiver 1200 receives this data from the resource controller 1130 and each resource controller under its control.

At process block 2108, the fitness metric calculator 1310 of the load aggregator 1120 calculates a fitness metric for each load 1160 under its control based on the profile data received from the profile transmitter 1220 of each resource controller 1130. The fitness metric calculator 1310 can calculate a fitness metric using the techniques described above. The calculated fitness metric for a particular load 1160 can represent the probability that the load will be available to respond to a frequency request during the control time window.

At process block 2110, the frequency threshold assigner 1320 can assign frequency thresholds for each load 1160 under its control. This can be accomplished by ordering the loads based on the fitness metric calculated by the fitness metric calculator 1310 for each load and assigning a frequency threshold accordingly. As discussed above, the loads 1160 with higher fitness metrics can be assigned frequency thresholds closer to the target grid frequency and loads with lower fitness metrics can be assigned frequency thresholds further from the target grid frequency.

At process block 2112, the frequency threshold transmitter 1330 can transmit an assigned frequency threshold to each resource controller 1130.

Figure 22:
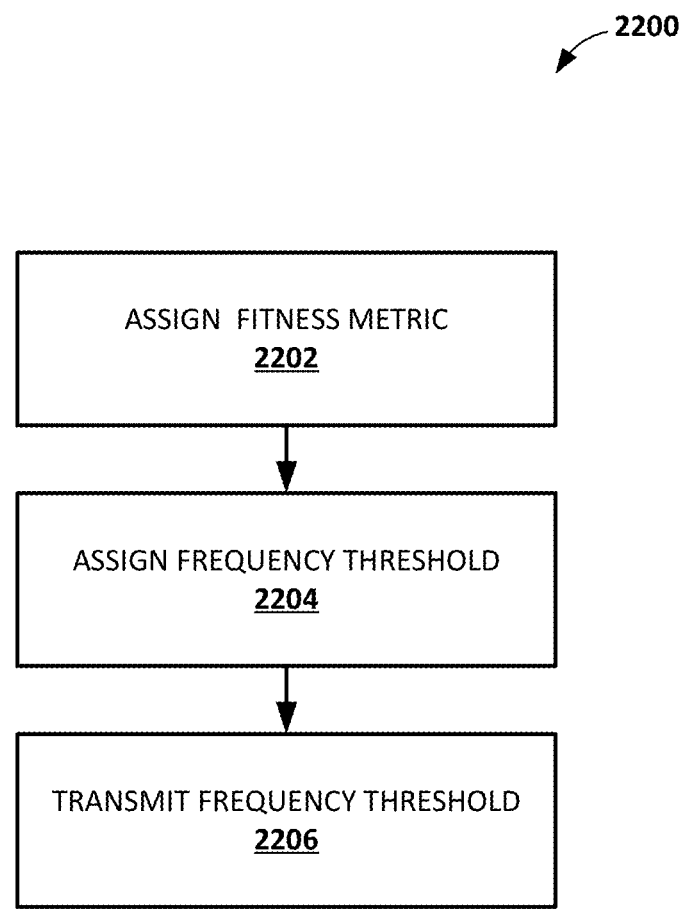
FIG. 22 is a flowchart depicting another example method of assigning frequency thresholds as can be performed in certain examples of the disclosed technology.

FIG. 22 is a flowchart 2200 depicting another example method of assigning frequency thresholds to grid-connected appliances. At process block 2202, the fitness metric calculator 1210 of the load aggregator 1120 determines a fitness metric for a grid-connected electrical device using the methods described above and assigns the determined fitness metric to the device. At process block 2204, the frequency threshold assigner 1220 assigns a frequency threshold to the device using the techniques described above. At process block 2206, the frequency threshold transmitter 1230 sends the assigned frequency to the device.

Figure 23:
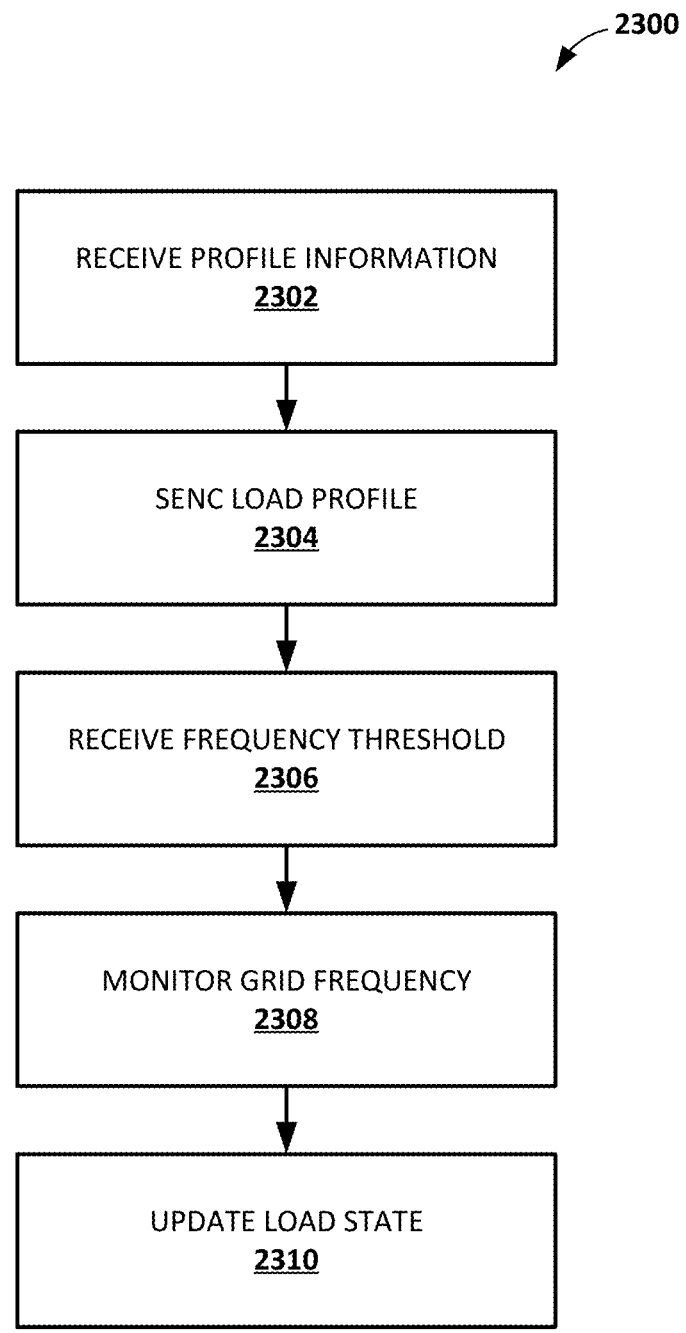
FIG. 23 is a flowchart depicting another example method of operating the example resource controller of FIG. 12 as can be performed in certain examples of the disclosed technology.

FIG. 23 is a flowchart 2300 depicting an example method of operating the example resource controller 1130. At process block 2302, the sensor data receiver 1300 and/or the load state receiver 1310 of the resource controller 1130 receive information from a grid-connected electrical device, such as data from one or more sensors connected to the device or information about the operational state of the device. At process block 2304, the profile transmitter 1320 sends a use profile based on the information received by the sensor data receiver 1300 and the load state receiver 1310 to the load aggregator 1120.

At process block 2306, the frequency threshold receiver 1330 receives a frequency threshold from the load aggregator 1120. At process block 2308, the grid frequency monitor 1340 monitors the frequency of the electrical grid that the device is connected to in order to determine a current grid frequency. At process block 2310, the load controller 1350 can update the operational state of the device based on the frequency threshold and the grid frequency. For example, in an under-frequency event, the load controller 1350 can deactivate the device if the grid frequency is below the frequency threshold. Or, in an over-frequency event, the load controller 1350 can activate the device if the grid frequency is above the frequency threshold.

Example Computing Environments

Figure 24:
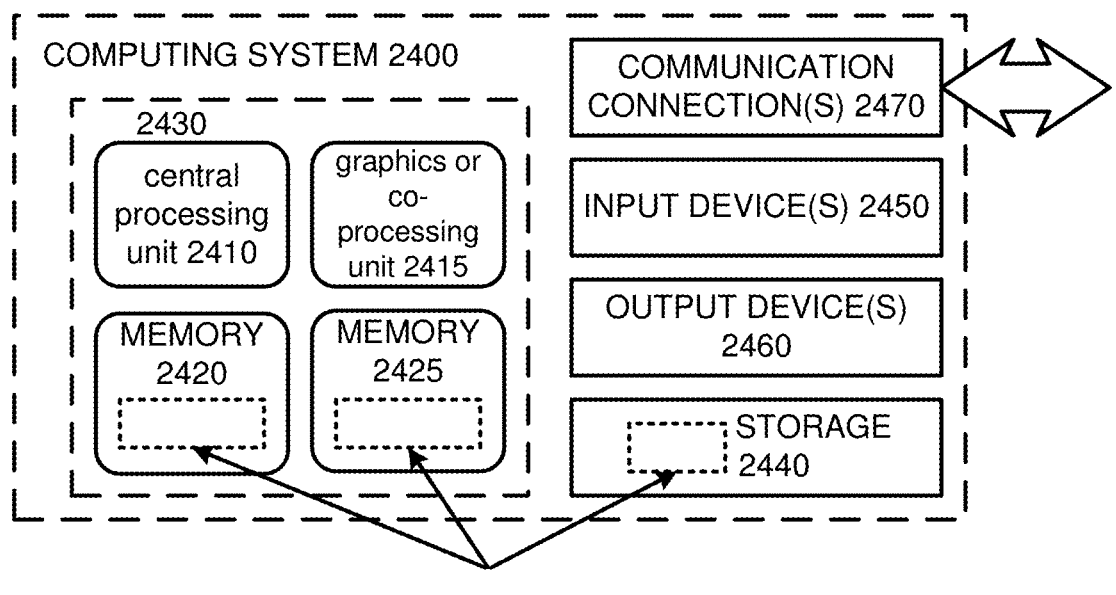
FIG. 24 is an example computing environment that can be used in conjunction with the technologies described herein.

FIG. 24 depicts a generalized example of a suitable computing system 2400 in which the described innovations may be implemented. The computing system 2400 is not intended to suggest any limitation as to scope of use or functionality, as the innovations may be implemented in diverse general-purpose or special-purpose computing systems.

With reference to FIG. 24, the computing system 2400 includes one or more processing units 2410, 2415 and memory 2420, 2425. In FIG. 24, this basic configuration 2430 is included within a dashed line. The processing units 2410, 2415 execute computer-executable instructions. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 24 shows a central processing unit 2410 as well as a graphics processing unit or co-processing unit 2415. The tangible memory 2420, 2425 may be volatile memory (e.g., registers, cache, RAM), non-volatile memory (e.g., ROM, EEPROM, flash memory, etc.), or some combination of the two, accessible by the processing unit(s). The memory 2420, 2425 stores software 2480 implementing one or more innovations described herein, such as curtailing frequency threshold selector 602 and rising frequency threshold selector 608 of FIG. 6, in the form of computer-executable instructions suitable for execution by processing units 2410 and/or 2415. A programmable logic device (PLD), such as an FPGA, can execute programmable-logic-device-executable instructions. An example of programmable-logic-device-executable instructions is the configuration bits for programming the PLD (such as a ".bit" file for a Xilinx® FPGA).

A computing system may have additional features. For example, the computing system 2400 includes storage 2440, one or more input devices 2450, one or more output devices 2460, and one or more communication connections 2470. An interconnection mechanism (not shown) such as a bus, controller, or network interconnects the components of the computing system 2400. Typically, operating system software (not shown) provides an operating environment for other software executing in the computing system 2400, and coordinates activities of the components of the computing system 2400.

The tangible storage 2440 may be removable or non-removable, and includes magnetic disks, magnetic tapes or cassettes, CD-ROMs, DVDs, or any other medium which can be used to store information and which can be accessed within the computing system 2400. The storage 2440 stores instructions for the software 2480 implementing one or more innovations described herein.

The input device(s) 2450 may be a touch input device such as a keyboard, mouse, pen, or trackball, a voice input device, a scanning device, or another device that provides input to the computing system 2400. For video encoding, the input device(s) 2450 may be a camera, video card, TV tuner card, or similar device that accepts video input in analog or digital form, or a CD-ROM or CD-RW that reads video samples into the computing system 2400. The output device(s) 2460 may be a display, printer, speaker, CD-writer, or another device that provides output from the computing system 2400.

The communication connection(s) 2470 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods. Additionally, the description sometimes uses terms like "provide" or "achieve" to describe the disclosed methods. These terms are high-level descriptions of the actual operations that are performed. The actual operations that correspond to these terms may vary depending on the particular implementation and are readily discernible by one of ordinary skill in the art having the benefit of the present disclosure.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example and with reference to FIG. 24, computer-readable storage media include memory 2420 and 2425, and storage 2440. The term computer-readable storage media does not include signals and carrier waves. In addition, the term computer-readable storage media does not include communication connections (e.g., 2470).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

For purposes of this description, certain aspects, advantages, and novel features of the embodiments of this disclosure are described herein. The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology.

As used in this application and in the claims, the singular forms "a," "an," and "the" include the plural forms unless the context clearly dictates otherwise. Additionally, the term "includes" means "comprises." Further, the terms "coupled" and "associated" generally mean electrically, electromagnetically, and/or physically (e.g., mechanically or chemically) coupled or linked and does not exclude the presence of intermediate elements between the coupled or associated items absent specific contrary language.

In some examples, values, procedures, or apparatus may be referred to as "lowest," "down," "upper," "lower," "horizontal," "vertical," "left," "right," and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object.

Additional Examples of the Disclosed Technology

Additional Examples of the disclosed subject matter are discussed herein in accordance with the examples discussed above.

According to one example of the disclosed technology, a method includes assigning a fitness metric to at least one electrical device coupled to a power grid, the fitness metric being based at least in part on an availability component and a quality component associated with the at least one electrical device, assigning a frequency threshold based on the fitness metric to cause the at least one electrical device to activate autonomously based on a frequency of the power grid, and transmitting the assigned frequency threshold to the at least one electrical device.

In some examples of the method, the availability component is based on a probability that the at least one electrical device will be available to perform a requested service.

In some examples of the method, the requested service is a request for the at least one electrical device to deactivate, and the availability component is based on a probability that the at least one electrical device will be active when the service is requested.

In some examples of the method, the requested service is a request for the at least one electrical device to activate, and the availability component is based on a probability that the at least one electrical device will not be active when the service is requested.

In some examples of the method, the quality component is based on the quality of performance of the at least one electrical device when it performs a requested service.

In some examples of the method, the quality component is based on a probability that the at least one electrical device will be able to successfully perform a requested service when requested.

In some examples of the method, the transmitting uses at least one of an Internet connection, an intranet connection, a powerline transceiver, or a wireless connection.

In some examples of the method, the at least one electrical device is a heater, an HVAC system, or a water heater.

In some examples of the method, the method further includes receiving a use profile associated with the at least one electrical device, and calculating the fitness metric based on the received use profile.

In some examples of the method, the use profile includes an operational state of the at least one electrical device at a particular time.

In some examples of the method, the use profile includes data from at least one sensor associated with the at least one electrical device.

In some examples of the method, the at least one electrical device comprises a first electrical device, the fitness metric comprises a first fitness metric, the frequency threshold comprises a first frequency threshold, and the method further includes assigning a second fitness metric to a second electrical device coupled to the power grid, the second fitness metric being based at least in part on a second availability component and a second quality component associated with the second electrical device, assigning a priority to the first and second electrical devices based on the first and second fitness metrics, assigning the first frequency threshold to the first electrical device and a second frequency threshold to the second electrical device based on the assigned priority of the devices, and transmitting the assigned second frequency threshold to the second electrical device.

In some examples of the method, the method further includes determining a first amount of power required to operate the at least one electrical device during a certain time period, transmitting the first amount of power to a grid operator, and receiving from the grid operator a second amount of power that can be allocated to the at least one electrical device during the time period.

In some examples of the method, a non-transitory computer-readable storage media stores computer-executable instructions that when executed by a computer cause the computer to perform the method.

According to another example of the disclosed technology, a load aggregator includes a processor, a communication interface coupled to a power grid, and memory storing computer-readable instructions that when executed by the processor, cause the processor to perform a method, the instructions including instructions that cause the processor to assign a fitness metric to at least one electrical device coupled to the power grid, the fitness metric being based at least in part on an availability component and a quality component associated with the at least one electrical device, instructions that cause the processor to assign a frequency threshold based on the fitness metric to cause the at least one electrical device to activate autonomously based on a frequency of the power grid, and instructions that cause the processor to transmit the assigned frequency threshold to the at least one electrical device.

In some examples of the load aggregator, the availability component is based on a probability that the at least one electrical device will be available to perform a requested service.

In some examples of the load aggregator, the quality component is based on the quality of performance of the at least one electrical device when it performs a requested service.

In some examples of the load aggregator, the instructions further include instructions that cause the processor to receive a use profile associated with the at least one electrical device and instructions that cause the processor to calculate the fitness metric based on the received use profile.

In some examples of the load aggregator, the at least one electrical device comprises a first electrical device, the fitness metric comprises a first fitness metric, the frequency threshold comprises a first frequency threshold, and the instructions further include instructions that cause the processor to assign a second fitness metric to a second electrical device coupled to the power grid, the second fitness metric being based at least in part on a second availability component and a second quality component associated with the second electrical device, instructions that cause the processor to assign a priority to the first and second electrical devices based on the first and second fitness metrics, instructions that cause the processor to assign the first frequency threshold to the first electrical device and a second frequency threshold to the second electrical device based on the assigned priority of the device, and instructions that cause the processor to transmit the assigned second frequency threshold to the second electrical device.

In some examples of the load aggregator, the instructions further include instructions that cause the processor to determine a first amount of power required to operate the at least one electrical device during a certain time period, instructions that cause the processor to transmit the determined first amount of power to a grid operator, and instructions that cause the processor to receive from the grid operator a second amount of power that can be allocated to the at least one electrical device during the time period.

According to another example of the disclosed technology, a method includes sending a use profile associated with the electrical device, responsive to the sending the use profile, receiving a frequency threshold, monitoring a grid frequency of the power grid, and activating or deactivating the electrical device based on the received frequency threshold and the monitored power grid frequency.

In some examples of the method, the method further includes activating the electrical device when the grid frequency is above the frequency threshold.

In some examples of the method, the method further includes deactivating the electrical device when the grid frequency is below the frequency threshold.

In some examples of the method, the method further includes receiving data from at least one sensor coupled to the electrical device, wherein the use profile is based at least in part on the data received from the at least one sensor.

In some examples of the method, the data received from the at least one sensor comprises temperature data.

In some examples of the method, the method further includes receiving data indicating an operational state of the electrical device, wherein the use profile is based at least in part on this received data.

According to another example of the disclosed technology, a resource controller includes a receiver configured to receive sensor data and load state data provided by an electrical device coupled to a power grid, and a processor coupled to the receiver and configured to perform a method by executing computer-readable instructions, the instructions including instructions that cause the processor to send a use profile associated with the electrical device based on the sensor data and the load state data, instructions that cause the processor to detect a grid frequency of the power grid, and instructions that cause the processor to activate or deactivate the electrical device based on a frequency threshold and the detected grid frequency.

In some examples of the resource controller, the instructions cause the processor to activate the electrical device when the detected grid frequency is above the frequency threshold.

In some examples of the resource controller, the instructions cause the processor to deactivate the device when the grid frequency is below the frequency threshold.

In some examples of the resource controller, the use profile is based at least in part on data generated by at least one sensor coupled to the electrical device.

In some examples of the resource controller, the use profile is based at least in part on data indicating an operational state of the device.

According to another example of the disclosed technology, a system includes a resource controller and a load aggregator. In some examples of the system, the resource controller includes a receiver configured to receive sensor data and load state data provided by an electrical device coupled to a power grid, and a first processor coupled to the receiver and configured to perform a method by executing computer-readable instructions, the instructions including instructions that cause the first processor to send a user profile associated with the electrical device based on the sensor data and the load data, instructions that cause the first processor to detect a grid frequency of the power grid, and instructions that cause the processor to activate or deactivate the electrical device based on a frequency threshold and the detected grid frequency. In some examples of the system, the load aggregator comprises a second processor, a communication interface coupled to the power grid, and memory storing computer-readable instructions that when executed by the second processor, cause the second processor to perform a method, the instructions including instructions that cause the second processor to assign a fitness metric to the electrical device, the fitness metric being based at least in part on an availability component and a quality component associated with the electrical device, instructions that cause the second processor to assign the frequency threshold based on the fitness metric, and instructions that cause the processor to transmit the assigned frequency threshold to the electrical device.

In view of the many possible embodiments to which the principles of the disclosed subject matter may be applied, it should be recognized that the illustrated embodiments are only preferred examples and should not be taken as limiting the scope of the claims to those preferred examples. Rather, the scope of the claimed subject matter is defined by the following claims. We therefore claim as our invention all that comes within the scope of these claims and their equivalents.

We claim:

1. A method comprising:
    with a computer:
        assigning a first fitness metric to a first electrical device coupled to a power grid, the first fitness metric indicating a likelihood that the first electrical device will perform a requested service over a time window, the first fitness metric being determined by combining an availability component and a quality component associated with the first electrical device;
        assigning a first frequency threshold based on the first fitness metric to cause the first electrical device to activate autonomously based on a frequency of the power grid;
        transmitting the assigned first frequency threshold to the first electrical device to cause the first electrical device to activate autonomously based on the assigned first frequency threshold and a frequency of the power grid;
        assigning a second fitness metric to a second electrical device coupled to the power grid, the second fitness metric being based at least in part on a second availability component and a second quality component associated with the second electrical device, the first fitness metric having a higher value than the second fitness metric;

assigning a priority to the first and second electrical devices based on the first and second fitness metrics;

assigning the first frequency threshold to the first electrical device and a second frequency threshold to the second electrical device based on the assigned priority of the devices, the first frequency threshold being closer to a target grid frequency than the second frequency threshold; and transmitting the assigned second frequency threshold to the second electrical device.

2. The method of claim 1, wherein the availability component is a value between 0 and 1 that indicates a probability that the first electrical device will be available to perform a requested service.

3. The method of claim 2, wherein the requested service is a request for the first electrical device to deactivate, and wherein the availability component is based on a probability that the electrical device will be active when the service is requested.

4. The method of claim 2, wherein the requested service is a request for the first electrical device to activate, and wherein the availability component is based on a probability that the first electrical device will not be active when the service is requested.

5. The method of claim 1, wherein the quality component is based on the quality of performance of the first electrical device when it performs a requested service, and wherein the quality metric is estimated by monitoring performance of the first electrical device in response to at least one previous request for the service.

6. The method of claim 1, wherein the quality component is a value between 0 and 1 that indicates based on a probability that the first electrical device will be able to successfully perform a requested service when requested.

7. The method of claim 1, wherein the transmitting uses at least one of an Internet connection, an intranet connection, a powerline transceiver, or a wireless connection, and wherein the quality metric depends at least in part on performance degradation of the first electrical device.

8. The method of claim 1, wherein the first electrical device is a heater, an HVAC system, or a water heater.

9. The method of claim 1, further comprising:
receiving a use profile associated with the first electrical device; and
calculating the first fitness metric based on the received use profile.

10. The method of claim 9, wherein the use profile includes an operational state of the first electrical device at a particular time, and wherein the first fitness metric depends at least in part on rate of failure of the first electrical device to respond to a requested service and/or a type of the requested service.

11. The method of claim 9, wherein the use profile includes data from at least one sensor associated with the first electrical device.

12. The method of claim 1, further comprising:
determining a first amount of power required to operate the first electrical device during a certain time period;
transmitting the first amount of power to a grid operator; and
receiving from the grid operator a second amount of power that can be allocated to the first electrical device during the time period.

13. The method of claim 1, further comprising activating the first electrical device when the grid frequency of the power grid is above the assigned first frequency threshold.

14. The method of claim 1, further comprising deactivating the first electrical device when the grid frequency of the power grid is below the assigned first frequency threshold.

15. The method of claim 1, wherein the first fitness metric is derived based on a use profile associated with the first electrical device, the method further comprising receiving data from at least one sensor coupled to the first electrical device, wherein the use profile is based at least in part on the data received from the at least one sensor.

16. The method of claim 15, wherein the data received from the at least one sensor comprises temperature data.

17. The method of claim 1, wherein the first fitness metric is derived based on a use profile associated with the first electrical device, the method further comprising receiving data indicating an operational state of the first electrical device, wherein the use profile is based at least in part on this received data.

18. A resource controller comprising:
a receiver configured to receive sensor data and load state data provided by an electrical device coupled to a power grid; and
a processor coupled to the receiver and configured to execute computer-readable instructions to perform the method of claim 1.

19. A load aggregator comprising:
a processor;
a communication interface coupled to a power grid; and
memory storing computer-readable instructions that when executed by the processor, cause the processor to perform a method, the instructions comprising:
instructions that cause the processor to assign respective fitness metrics to a plurality of electrical devices coupled to the power grid including at least a first electrical device and a second electrical device, the fitness metric assigned to a respective one of the electrical devices being a probability that is calculated as a combination of an availability component and a quality component associated with the respective one of the electrical devices, wherein a first fitness metric assigned to the first electrical device has a higher value than a second fitness metric assigned to the second electrical device;
instructions that cause the processor to assign respective frequency thresholds to the electrical devices based on their fitness metrics to cause the electrical devices to activate autonomously based on a frequency of the power grid, including instructions that cause the processor to assign a first frequency threshold to the first electrical device and a second frequency threshold to the second electrical device, the first frequency threshold being closer to a target grid frequency than the second frequency threshold; and
instructions that cause the processor to transmit the respective assigned frequency thresholds to the plurality of electrical devices to cause the plurality of electrical devices to activate autonomously based on the respective assigned frequency thresholds and a frequency event of the power grid.

20. The load aggregator of claim 19, wherein the availability component associated with a respective one of the electrical devices is based on a probability that the respective electrical device will be available to perform a requested service.

21. The load aggregator of claim 19, wherein the quality component associated with a respective one of the electrical devices is based on the quality of performance of the respective electrical device when it performs a requested service.

22. The load aggregator of claim 19, wherein the instructions further comprise:
instructions that cause the processor to receive respective use profiles associated with the electrical devices; and
instructions that cause the processor to calculate the respective fitness metrics based on the received use profiles.

23. The load aggregator of claim 19, wherein the instructions further comprise:
instructions that cause the processor to determine a first amount of power required to operate the first electrical device during a certain time period;
instructions that cause the processor to transmit the determined first amount of power to a grid operator; and
instructions that cause the processor to receive from the grid operator a second amount of power that can be allocated to the first electrical device during the time period.

24. A system comprising:
the load aggregator of claim 19; and
a resource controller comprising:
a receiver configured to receive sensor data and load state data provided by an electrical device coupled to a power grid; and
a first processor coupled to the receiver and configured to perform a method by executing computer-readable instructions, the instructions comprising:
instructions that cause the first processor to send a use profile associated with the electrical device to the load aggregator, the use profile being based on the sensor data and the load state data;
instructions that cause the first processor to detect a grid frequency of the power grid; and
instructions that cause the processor to activate or deactivate the electrical device based on the assigned frequency threshold and the detected grid frequency.

25. One or more non-transitory computer-readable storage media storing computer-executable instructions that when executed by a computer, cause the computer to perform a method, the method comprising:
assigning a first fitness metric to a first electrical device coupled to a power grid, the first fitness metric indicating a likelihood that the first electrical device will perform a requested service over a time window, the first fitness metric being determined by combining an availability component and a quality component associated with the first electrical device;
assigning a first frequency threshold based on the first fitness metric to cause the first electrical device to activate autonomously based on a frequency of the power grid;
transmitting the assigned first frequency threshold to the first electrical device to cause the first electrical device to activate autonomously based on the assigned first frequency threshold and a frequency of the power grid;
assigning a second fitness metric to a second electrical device coupled to the power grid, the second fitness metric being based at least in part on a second availability component and a second quality component associated with the second electrical device, the first fitness metric having a higher value than the second fitness metric;
assigning a priority to the first and second electrical devices based on the first and second fitness metrics;
assigning the first frequency threshold to the first electrical device and a second frequency threshold to the second electrical device based on the assigned priority of the devices, the first frequency threshold being closer to a target grid frequency than the second frequency threshold; and
transmitting the assigned second frequency threshold to the second electrical device.

26. The one or more non-transitory computer-readable storage media of claim 25, wherein the availability component is based on a probability that the first electrical device will be available to perform a requested service.

27. The one or more non-transitory computer-readable storage media of claim 26, wherein the requested service is a request for the first electrical device to deactivate, and wherein the availability component is based on a probability that the first electrical device will be active when the service is requested.

28. The one or more non-transitory computer-readable storage media of claim 26, wherein the requested service is a request for the first electrical device to activate, and wherein the availability component is based on a probability that the first electrical device will not be active when the service is requested.

29. The one or more non-transitory computer-readable storage media of claim 25, wherein the quality component is based on the quality of performance of the first electrical device when it performs a requested service.

30. The one or more non-transitory computer-readable storage media of claim 25, wherein the quality component is based on a probability that the first electrical device will be able to successfully perform a requested service when requested.

31. The one or more non-transitory computer-readable storage media of claim 25, wherein the quality metric depends at least in part on performance degradation of the first electrical device.

32. The one or more non-transitory computer-readable storage media of claim 25, wherein the method further comprises receiving a use profile associated with the first electrical device, and calculating the first fitness metric based on the received use profile, and wherein the use profile includes an operational state of the first electrical device at a particular time.

33. The one or more non-transitory computer-readable storage media of claim 25, wherein the first fitness metric depends at least in part on rate of failure of the first electrical device to respond to a requested service and/or a type of the requested service.

34. The one or more non-transitory computer-readable storage media of claim 25, wherein the method further comprises:
determining a first amount of power required to operate the first electrical device during a certain time period;
transmitting the first amount of power to a grid operator; and
receiving from the grid operator a second amount of power that can be allocated to the first electrical device during the time period.

* * * * *